(12) United States Patent
Kim et al.

(10) Patent No.: US 11,726,526 B2
(45) Date of Patent: Aug. 15, 2023

(54) ELECTRONIC DEVICE INCLUDING FLEXIBLE DISPLAY

(71) Applicant: Samsung Electronics Co., Ltd., Gyeonggi-do (KR)

(72) Inventors: Bohyeon Kim, Gyeonggi-do (KR); Myunghoon Kwak, Gyeonggi-do (KR); Junhyuk Kim, Gyeonggi-do (KR); Moonsun Kim, Gyeonggi-do (KR); Changryong Heo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/521,132

(22) Filed: Nov. 8, 2021

(65) Prior Publication Data

US 2022/0149506 A1 May 12, 2022

Related U.S. Application Data

(63) Continuation of application No. PCT/KR2021/016161, filed on Nov. 8, 2021.

(30) Foreign Application Priority Data

Nov. 6, 2020 (KR) .................. 10-2020-0147783
Apr. 7, 2021 (KR) .................. 10-2021-0045487

(51) Int. Cl.
*G06F 1/16* (2006.01)
*H01Q 1/24* (2006.01)
*H02J 50/10* (2016.01)

(52) U.S. Cl.
CPC .......... *H01Q 1/243* (2013.01); *G06F 1/1624* (2013.01); *G06F 1/1635* (2013.01); *G06F 1/1652* (2013.01); *H02J 50/10* (2016.02)

(58) Field of Classification Search
CPC .... G06F 1/1624; G06F 1/1635; G06F 1/1652; G06F 1/1698
See application file for complete search history.

(56) References Cited

U.S. PATENT DOCUMENTS 8,754,608 B2 * 6/2014 Yoon ............... H02J 50/10
320/108
8,907,619 B2 * 12/2014 Shukuya ............. G12B 5/00
74/490.09

(Continued)

FOREIGN PATENT DOCUMENTS

CN 110299740 10/2019
CN 210041386 2/2020

(Continued)

OTHER PUBLICATIONS

International Search Report dated Feb. 22, 2022 issued in counterpart application No. PCT/KR2021/016161, 11 pages.

*Primary Examiner* — Adrian S Wilson
(74) *Attorney, Agent, or Firm* — The Farrell Law Firm, P.C.

(57) ABSTRACT

Disclosed is an electronic device including a first housing including a first surface oriented in a first direction, a second surface oriented in a second direction opposite to the first direction, a first side surface at least partially surrounding a space between the first surface and the second surface, and a second side surface facing away from the first side surface, a flexible display including a first region oriented in a first direction and a second region extending from the first region, wherein the first region is configured to be expandable by causing at least a part of the second region to be oriented in the first direction based on a slide movement of at least a part of the housing, and an antenna module disposed adjacent to the second surface of the housing, the antenna module including a wireless charging antenna, and (Continued)

a module mounting unit configured to surround at least a part of the wireless charging antenna and to be movable in an internal space inside the housing such that the wireless charging antenna is located in a center of a width of the housing in response to a state of the electronic device according to expansion or contraction of a display region of the display.

15 Claims, 17 Drawing Sheets

(56) References Cited

U.S. PATENT DOCUMENTS

| | | | |
|---|---|---|---|
| 9,819,214 B2* | 11/2017 | Han | H02J 50/90 |
| 10,283,998 B2* | 5/2019 | Hong | H02J 7/0042 |
| 10,447,064 B2* | 10/2019 | Chi | H04B 5/0087 |
| 10,892,653 B1* | 1/2021 | Rolfe | H02J 7/0045 |
| 11,005,309 B2* | 5/2021 | Bober | H02J 50/005 |
| 11,239,682 B2* | 2/2022 | Cakmak | H02J 50/90 |
| 2011/0074344 A1 | 3/2011 | Park et al. | |
| 2013/0249308 A1 | 9/2013 | Yeh | |
| 2019/0312451 A1 | 10/2019 | An et al. | |
| 2021/0135492 A1 | 5/2021 | Kim et al. | |

FOREIGN PATENT DOCUMENTS

| | | |
|---|---|---|
| KR | 1020110034773 | 4/2011 |
| KR | 10-2019-0118058 | 10/2019 |
| KR | 1020190115888 | 10/2019 |

* cited by examiner

ELECTRONIC DEVICE INCLUDING FLEXIBLE DISPLAY

PRIORITY

This application is a continuation of International Application No. PCT/KR2021/016161 designating the United States, filed on Nov. 8, 2021, in the Korean Intellectual Property Receiving Office and claiming priority to Korean Patent Application No. 10-2020-0147783, filed on Nov. 6, 2020 and Korean Patent Application No. 10-2021-0045487, filed on Apr. 7, 2021, in the Korean Intellectual Property Office, the disclosures of which are incorporated by reference herein in their entireties.

BACKGROUND

1. Field

The disclosure relates generally to an electronic device, and more particularly, to an electronic device including a flexible display having a wireless charging antenna for enhanced wireless charging efficiency.

2. Description of Related Art

As the demand for mobile communication and the degree of integration of electronic devices increase, it is desired for portability of mobile communication terminals to improve. For example, by replacing a traditional mechanical (button-type) keypad with a touch screen display, an electronic device can be miniaturized while maintaining the function of the input device. Also, the portability of the electronic device can be improved when a mechanical keypad is removed from the electronic device. Further, when a display is expanded by the region in which the mechanical keypad is removed, touchscreen electronic device can provide a larger screen compared to an electronic device including the mechanical keypad, even when the electronic device including the touch screen function has the same size and weight as the electronic device including the mechanical keypad.

When using a web surfing or multimedia function, it may be more convenient to use an electronic device having a larger screen. However, considering the portability of the electronic device, there may be restrictions in increasing the size of the display. A display using an organic light-emitting diode (OLED) or the like may enable convenient portability of an electronic device while providing a larger screen. For example, a display using an OLED may enable implementation of a stable operation even if the display is made very thin so that the display can be mounted on an electronic device in a foldable, bendable, slidable, or rollable form.

Current wireless charging technology may use an electromagnetic induction phenomenon. When a current flows from an external charging device (e.g., a charger) to a power transmission coil (a TX loop coil), magnetic flux is induced and causes a current to flow via a power reception coil (an RX loop coil) of the electronic device. Charging the battery of the electronic device may proceed using the induced current. Due to the characteristic of the wireless charging antenna using the electromagnetic induction phenomenon, it is possible to achieve high charging efficiency when the center of the power reception coil and the center of the transmission coil coincide with each other. In general, when using wireless charging, a user may mount an electronic device housing on the pad of an external charging device such that the center of the electronic device housing coincides with the pad in order to maximize the charging efficiency. For this reason, a loop-type wireless charging antenna may be mounted inside the electronic device at the center of the housing of the electronic device.

Since the screen size of the electronic device display is fixed, the width of the electronic device housing on which the display is mounted is maintained in a fixed state rather than being variable. Accordingly, when the wireless charging antenna is centrally mounted with the center of the electronic device housing, compatibility with the pad (a wireless charging transmitter) of the external charging device is maintained.

However, in an electronic device having an expandable display (e.g., a foldable, slidable, or rollable electronic device), the center of the wireless charging antenna may not coincide with the center of the housing of the electronic device when the housing is expanded. In this case, misalignment tends to occur between the wireless power transmission coil and the wireless power reception coil, thereby causing reduction of wireless charging efficiency.

As such, there is a need in the art for an electronic device in which, when the width of the device housing is expanded, the wireless charging antenna is also movable, thereby maximizing the wireless charging efficiency of the electronic device.

SUMMARY

The disclosure has been made to address at least the above-mentioned problems and/or disadvantages and to provide at least the advantages described below.

Accordingly, an aspect of the disclosure is to provide an electronic device which, when the width of the housing of the electronic device is changed by the expansion or contraction of the display, the position of the wireless charging antenna is also changed, enabling the wireless charging antenna to be centrally located even when the display is in the expanded or contracted state. This enhances wireless charging efficiency.

Another aspect of the disclosure is to provide improved compatibility between the electronic device and a wireless charging pad or other accessories.

In accordance with an aspect of the disclosure, an electronic device includes a first housing including a first surface oriented in a first direction, a second surface oriented in a second direction opposite to the first direction, a first side surface at least partially surrounding a space between the first surface and the second surface, and a second side surface facing away from the first side surface, a flexible display including a first region oriented in a first direction and a second region extending from the first region, wherein the first region is configured to be expandable by causing at least a part of the second region to be oriented in the first direction based on a slide movement of at least a part of the housing, and an antenna module disposed adjacent to the second surface of the housing, the antenna module including a wireless charging antenna, and a module mounting unit configured to surround at least a part of the wireless charging antenna and to be movable in an internal space inside the housing such that the wireless charging antenna is located in a center of a width of the housing in response to a state of the electronic device according to expansion or contraction of a display region of the display.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
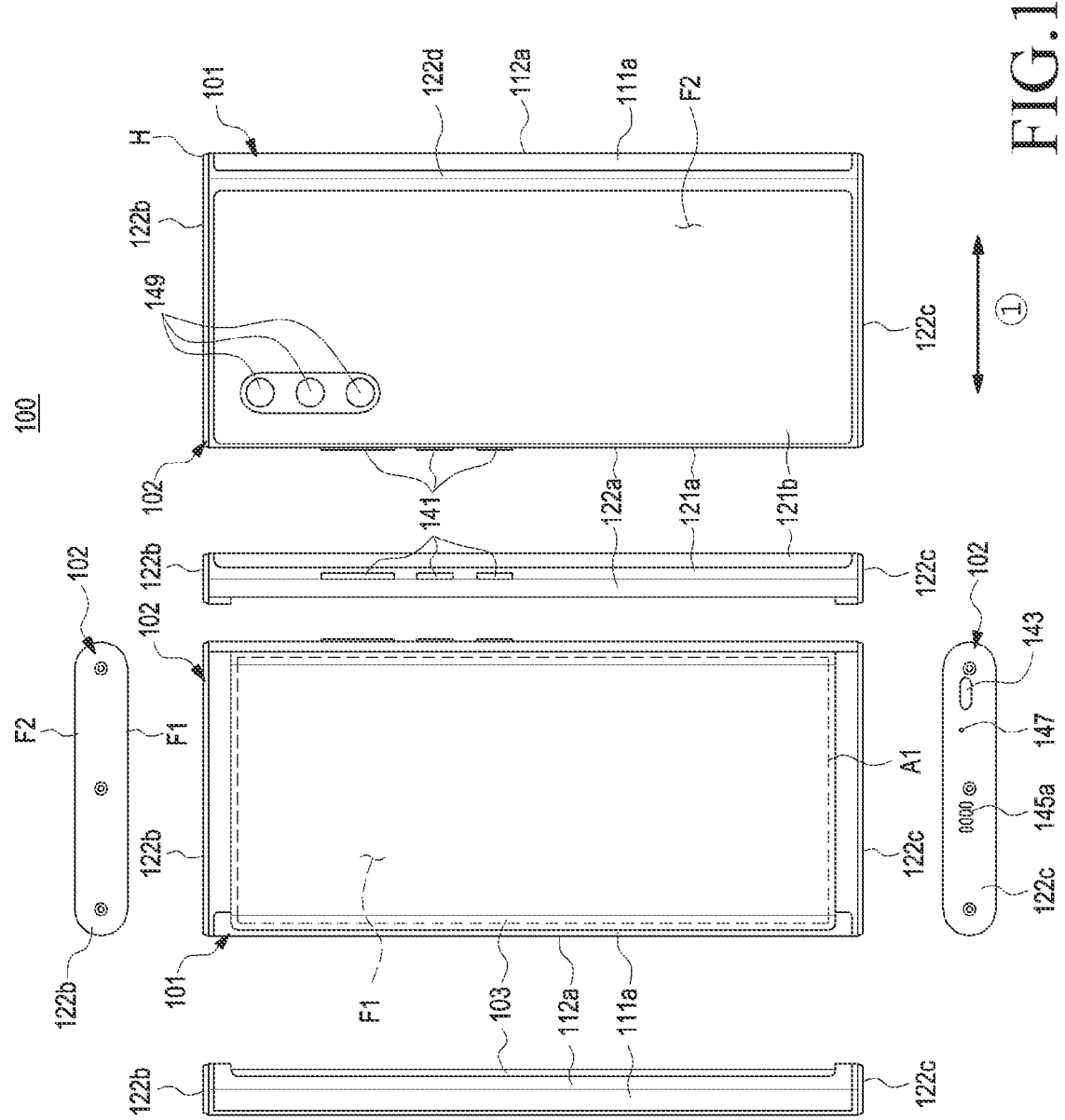
FIG. 1 illustrates an electronic device when a first structure is accommodated in a second structure, according to an embodiment.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

It should be appreciated that embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to distinguish a corresponding element from another, and do not limit the elements in importance or order. It is to be understood that if an element (e.g., a first element) is referred to, with or without the term "operatively" or "communicatively", as "coupled with," "coupled to," "connected with," or "connected to" another element (e.g., a second element), this indicates that the first element may be coupled with the second element directly (e.g., wiredly), wirelessly, or via a third element.

An electronic device herein may be implemented by selectively combining configurations of different embodiments, and the configuration of one embodiment may be replaced by that of another embodiment. For example, it is noted that the disclosure is not limited to specific figures or embodiments.

Figure 2:
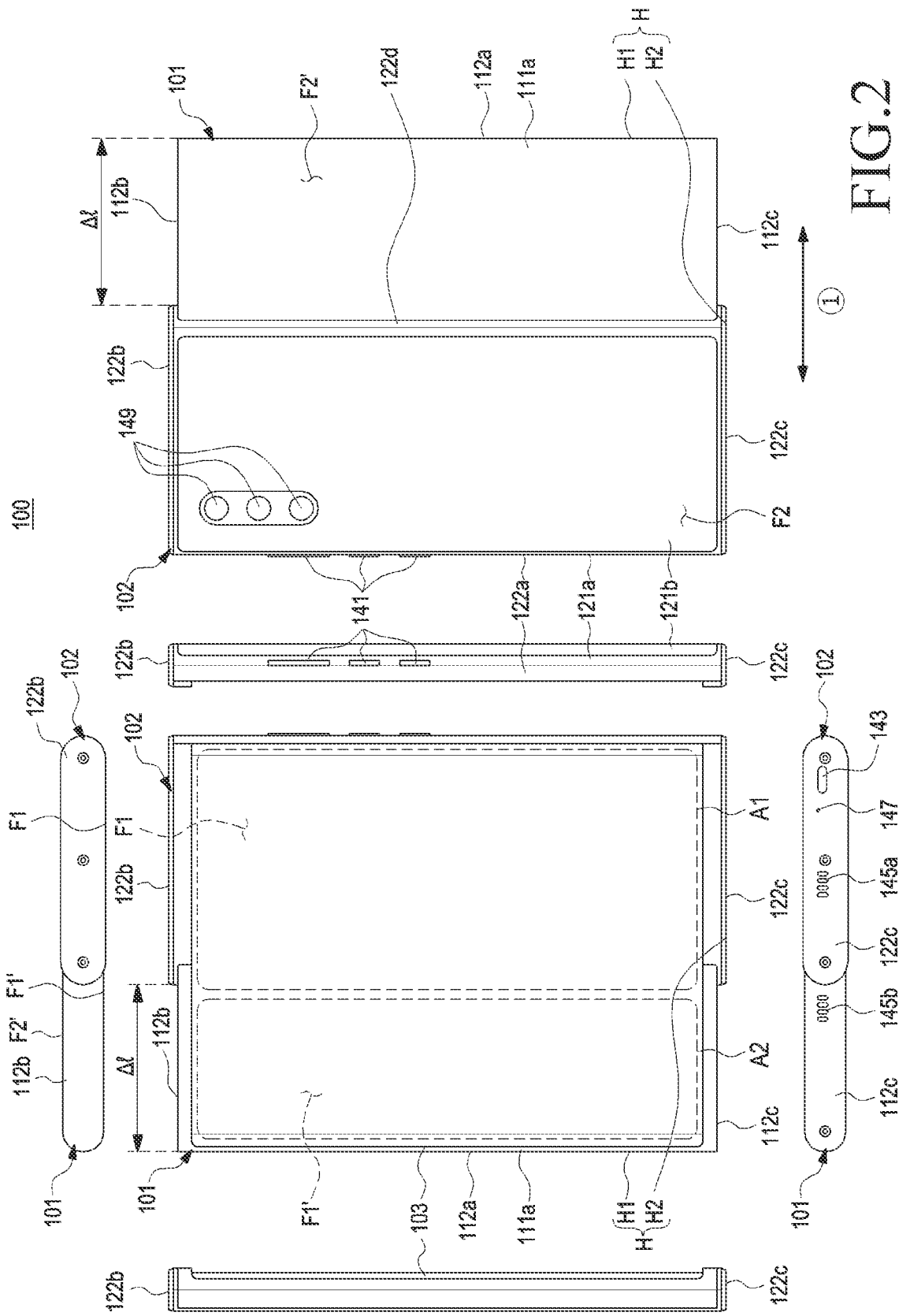
FIG. 2 illustrates an electronic device when the first structure is drawn out of the second structure, according to an embodiment.

FIG. 1 illustrates an electronic device 100 when a first structure 101 is accommodated in a second structure 102 according to an embodiment. FIG. 2 illustrates the electronic device 100 when the first structure 101 is drawn out of the second structure 102 according to an embodiment.

Referring to FIGS. 1 and 2, the electronic device 100 may include the first structure 101 and the second structure 102. The first structure 101 and the second structure 102 may have substantially similar heights, and the first structure 101 may be engaged and assembled with the second structure 102 such that the first structure 101 is at least partially surrounded by the second structure 102. When the first structure 101 is assembled to the second structure 102, the first structure 101 may be disposed to be slidable on the second structure 102. The first structure 101 may be disposed to be reciprocable by a predetermined distance in the directions indicated by arrow ① with respect to the second structure 102. When moving (e.g., sliding) with respect to the second structure 102, the first structure 101 may be received (or inserted) into the second structure 102 (e.g., slide-in operation) or drawn out of the second structure 102. (e.g., slide-out operation).

Herein, the "housing H" of the electronic device 100 may collectively refer to portions defining the exterior of the first structure 101 and the second structure 102. The first structure 101 may be referred to as a "first housing H1", a "slide unit", or a "slide housing". The second structure 102 may be referred to as a "second housing H2", a "main unit", or a "main housing". The housing defines an internal space of the electronic device 100. The internal space may accommodate a structure such as a plate or a bracket or may accommodate various electrical and electronic components including a circuit board, a battery, a connector (e.g., a flexible printed circuit board (FPCB) or a cable), and/or a processor.

The electronic device 100 may include a flexible display 103 (hereinafter, a display 103). The display 103 may be disposed to display visual information such as an image or a picture through at least one surface of the housing H. In the display 103, the area for displaying visual information may be variously changed in response to various states of the electronic device 100. For example, in the display 103, the area for displaying visual information may be expanded or contracted (hereinafter, referred to as expansion of the display 103 or contraction of the display 103) in various states of the electronic device 100. Herein, the area on which the display 103 displays visual information may be described as an area in which at least a part of the display 103 is exposed to be visible from the outside of the electronic device 100.

Various operations of components included in the electronic device 100 may be defined as being operated in various "states" of the electronic device 100. For example, the state in which the first structure 101 is completely accommodated inside the second structure 102 (or a slid-in state), or the maximally contracted state of the display 103 may be defined as a first state of the electronic device 100. In addition, the state in which the first structure 101 is completely drawn out of the second structure 102. (or a slid-out state) or the maximally expanded state of the display 103 may be defined as a second state of the electronic device 100. In addition, the state in which the first structure 101 is sliding with respect to the second structure 102 (the state in which the display 103 is being expanded or contracted) may be defined as a third state of the electronic device 100 (the intermediate state of electronic device 100). For example, the state illustrated in FIG. 1 may be the first state of the electronic device 100 in which the first region A1 of the display 103 is exposed to be visible from the outside of the electronic device 100 and the second region A2 is hidden to be invisible from the outside of the electronic device 100.

The state illustrated in FIG. 2 may be the second state of the electronic device 100 in which a larger area of the display 103 is exposed to be visible from the outside of the electronic device 100. The first state of the electronic device 100 illustrated in FIG. 1 may be defined as when the first structure 101 is closed with respect to the second structure 102, and the second state of the electronic device 100 illustrated in FIG. 2 may be defined as when the first structure 101 is opened with respect to the second structure 102. The closed state or the open state of the first structure 101 with respect the second structure 102 may be defined as when the electronic device 100 is closed or opened. The state in which the electronic device 100 is closed may be defined as when the region of the display 103 exposed to the outside is minimized, and the state in which the electronic device 100 is opened may be defined as when the region of the display 103 exposed to the outside is maximized.

The first region A1 of the display 103 may be seated on the first surface F1 (e.g., the front surface) of the housing H. The second region A2 of the display 103 may be hidden to be invisible from the outside of the electronic device 100 when the first structure 101 is completely accommodated in the second structure 102 (hereinafter, referred to as the first state of the electronic device) and may be exposed to be visible from the outside of the electronic device 100 when the first structure 101 is completely drawn out of the second structure 102 (hereinafter, referred to as the second state of the electronic device 100). The first region A1 of the display 103 may be a basic use region of the display 103 in the first state of the electronic device 100, and the second region A2 of the display 103 may be an expended region of the display 103 in the second state of the electronic device 200. Referring to FIG. 2, in the second state of the electronic device, the expanded region (e.g., the second region A2) of the display 103 may be seated, together with the basic use area (e.g., the first region A1) of the display 103, on the first surface F1 and F1' (e.g., the front surface) of the housing H provided by the first structure 101 and the second structure 102.

The display 103 may include the first region A1, which is the basic use region, and the second region A2, which is the region expandable based on the sliding movement of the first structure 310. The second region A2 may be a portion extending from the first region A1. In addition, the display 103 may further include a third region (e.g., the third region A3 of FIG. 3 below) extending from the second region A2. The first region A1, the second region A2, and the third region A3 are divided for convenience of description and are not functionally or physically divided from each other. The display 103 may include a first portion, which is a region visible from the outside through at least one surface of the housing H, and a second portion that is at least partially surrounded by the housing H to be invisible from the outside. When the first portion of the display 103 is expanded based on the slide-out operation of the first structure 101 with respect to the second structure 102, the second portion may be contracted. In contrast, when the first portion is contracted based on the slide-in operation of the first structure 101 with respect to the second structure 102, the second portion may be expanded. The first portion and the second portion are also divided for convenience of description and are not necessarily functionally or physically divided from each other. Herein, the portions referred to as first portion and second portion or first region and second region regarding the display 103 are substantially the same as or similar to each other in configuration.

The first region A1 may be always exposed through one surface of the housing H and is visible from the outside regardless of whether the display 103 is expanded or not. The second region A2 may be at least partially surrounded by the housing H to be invisible from the outside in the first state of the electronic device 100 and is visible from the outside through at least one surface of the housing H in the second state of the electronic device 100. The first region A1 may provide a first portion that is visible from the outside through at least one surface of the housing H in all of the first state, the third state (hereinafter, referred to as an intermediate state), and the second state of the electronic device 100, and the second region A2 may provide a first portion that is a region visible from the outside through at least one surface of the housing H together with the first region A1 in the intermediate state and the second state of the electronic device 100.

The third region A3 may configure a second portion that is not visible from the outside in all of the first state, the intermediate state, and the second state of the electronic device 100. For example, as illustrated in FIG. 2, when the display 103 of the electronic device 100 is viewed from above, the first region A1 and the second region A2 may be exposed to the outside, but the third region A3 may be invisible from the outside unlike the second region A2. The third region A3 may be substantially different from the first region A1 and/or the second region A2 by not including components such as pixels that emit light to display an image, signal lines, or touch panels, which are included in the first region A1 and/or the second region A2. The third region A3 may be omitted from the display 103.

The first structure 101 may include a first plate 111a (e.g., a slide plate), a $(1\text{-}1)^{th}$ side wall 112a extending from the first plate 111a, a $(1\text{-}2)^{th}$ side wall 112b extending from the first plate 111a and the $(1\text{-}1)^{th}$ side wall 112a, and a $(1\text{-}3)^{th}$ side wall 112c extending from the $(1\text{-}1)^{th}$ side wall 112a and the first plate 111a and parallel to the $(1\text{-}2)^{th}$ side wall 112b. The second structure 102 may include a second plate 121a (e.g., a fixed plate or a rear case), a $(2-1)^{th}$ side wall 122a extending from the second plate 121a, a $(2-2)^{th}$ side wall 122b extending from the $(2-1)^{th}$ side wall 122a and the second plate 121a, and a $(2-3)^{th}$ side wall 122c extending from the $(2-1)^{th}$ side wall 122a and the second plate 121a and parallel to the side wall 122b. The second structure 102 may further include a $(2-4)^{th}$ side wall 124c extending from the second plate 121a and parallel to the $(2-1)^{th}$ side wall 122a. For example, the state in which the first structure 101 is "accommodated" in the second structure 102 (the first state of the electronic device 100 or the intermediate state of the electronic device 100) may mean the state in which at least a part of the first structure 101 (or a component included in the first structure 101) is surrounded by the $(2-2)^{th}$ side wall 122b, the $(2-3)^{th}$ side wall 122c, and/or the $(2-4)^{th}$ side wall 122d. In addition, the state in which the first structure 101 is "drawn out" of the second structure 102 (the second state of the electronic device 100) may mean the state in which at least a part of the first structure 101 (or a component included in the first structure 101) is not surrounded by the $(2-2)^{th}$ side wall 122b, the $(2-3)^{th}$ side wall 122c, and/or the $(2-4)^{th}$ side wall 122d.

The second structure 102 may further include a third plate 121b (e.g., a rear window). Referring to FIG. 2, the third plate 121b may be coupled to surround at least a part of the second plate 121a. The third plate 121b may be substantially integrated with the second plate 121a. The electronic device 100 may display an additional screen through the third plate 121b or may be provided with a third plate 121b having a material different from that of the second plate 121a to improve the exterior design and/or protect the rear surface of the housing from damage or outside elements.

The first $(1-2)^{th}$ side wall 112b and the $(1-3)^{th}$ side wall 112c of the first structure 101 may be provided to be perpendicular to the $(1-1)^{th}$ side wall 112a. In addition, the $(2-1)^{th}$ side wall 122b and the $(2-3)^{th}$ side wall 122c of the second structure 102 may be provided to be perpendicular to the $(2-1)^{th}$ side wall 122a and/or the $(2-4)^{th}$ side wall 122d. The second structure 102 may be configured such that one side (e.g., the front surface) is opened to accommodate (or surround) at least a part of the first structure 101. When it is described that the second structure 102 is configured to be opened, this indicates that an opening is provided through the $(2-4)^{th}$ side wall 122 of the second structure 102 such that the second structure 102 is accommodated or drawn out therethrough. For example, the first structure 101 may be coupled to the second structure 102 by being at least partially surrounded by the second structure 102 and may be slid in the width direction indicated by arrow ① while being guided by the second structure 102.

As illustrated in FIG. 1, in the first state of the electronic device 100, the second surface F2 of the housing H may be defined by one surface of the second plate 121a (and/or the third plate 121b), and, as illustrated in FIG. 2, the second surface F2 and F2' of the housing H in the second state of the electronic device 100 may be defined by one surface of the first plate 111a and one surface of the second plate 121a (and/or the third plate 121b).

The first plate 111a may be provided to cover at least a part of the display 103. For example, when the first structure 101 is at least partially accommodated inside the second structure 102, the first plate 111a may cover the second region A2 of the display 103. Alternatively, the second plate 121a and/or the third plate 121b may be provided to cover at least a part of the display 103. For example, when the first structure 101 is at least partially accommodated inside the second structure 102, the second region A2 of the display 103 may be provided to be hidden by the second structure 102. In this case, the second plate 121a or the third plate 121b may cover a part of the display 103.

The first structure 101 may be slidable in the direction ① with respect to the second structure 102. In this case, the distance between the $(1-1)^{th}$ side wall 112a of the first structure 101 and the $(2-1)^{th}$ side wall 122a of the second structure 102 may be variable. The first structure 101 is movable with respect to the second structure 102 such that in the first state of the electronic device 100, the first structure 101 is placed at a first distance from the $(2-1)^{th}$ side wall 122a, and in the second state of the electronic device 100, the first structure 101 is placed at a second distance greater than the first distance from the $(2-1)^{th}$ side wall 122a.

The display 103 may include a display panel coupled to or disposed adjacent to a touch detection circuit, a pressure sensor capable of measuring a touch intensity (pressure), and/or a digitizer configured to detect a magnetic-field-type stylus pen. The display 103 may display various images or pictures through the display panel. Regarding an expandable length l of the display 103, the display 103 may be movable by $\Delta l_1$ smaller than the maximally expandable length $\Delta l_2$. For example, in the second region A2 of the display 103, only by turning on a first portion that is visible from the outside and turning off or the remaining portion that is invisible from the outside or adjusting the remaining portion in terms of touch input sensitivity, it is possible for the electronic device 100 to reduce current consumption of the electronic device 100 and to perform an operation for improving touch misrecognition.

The electronic device 100 may include a display 103, a key input device 141, a connector hole 143, audio modules 145a, 145b, and 147, and a camera module 149. The electronic device 100 may further include various electronic components (or electronic component modules) including an indicator (e.g., a light-emitting diode (LED)) or various sensor modules.

The key input device 141 may be disposed on the $(2-2)^{th}$ side wall 122b or the $(2-3)^{th}$ side wall 122c of the second structure 102. The electronic device 100 may be designed such that, depending on the exterior and usage state, the illustrated key input devices 141 are omitted or an additional key input device(s) is(are) included. The electronic device 100 may include a key input device, such as a home key button or a touch pad disposed around the home key button. At least some of the key input devices 141 may be located in one region of the first structure 101.

The connector hole 143 may be omitted and may accommodate a universal serial bus (USB) connector for transmitting and receiving power and/or data to and from an external electronic device. The electronic device 100 may include a plurality of connector holes 143, and some of the connector holes 143 may function as connector holes for transmitting and receiving audio signals to and from an external electronic device. In FIG. 2, the connector hole 143 is disposed in the $(2-3)^{th}$ side wall 122c, but the disclosure is not limited thereto. The connector hole 143 or another connector hole may be disposed in the $(2-1)^{th}$ side wall 122a or the $(2-2)^{th}$ side wall 122b.

The audio modules 145a, 145b, and 147 may include speaker holes 145a and 145b or a microphone hole 147. One of the speaker holes 145a and 145b may be provided as a receiver hole for a voice call, and another one may be provided as an external speaker hole. The microphone hole 147 may include a microphone disposed therein so as to acquire external sound, and multiple microphones may be disposed therein so as to sense the direction of sound. The speaker holes 145a and 145b and the microphone hole 147 may be implemented as a single hole, or a speaker may be included without the speaker holes 145a and 145b (e.g., a piezo speaker). The speaker hole indicated by reference numeral "145b" may be disposed in the first structure 101 to be utilized as a receiver hole for a voice call, and the speaker hole (e.g., an external speaker hole) indicated by reference numeral "145a" or the microphone hole 147 may be disposed on one side of the second structure 102 (e.g., one of the side walls 122a, 122b, and 122c).

The camera module 149 may be provided in the second structure 102. The camera module 149 may be configured to photograph a subject in a direction opposite to the first region A1 of the display 103. The electronic device 100 may include a plurality of camera modules 149. For example, the electronic device 100 may include a wide-angle camera, a telephoto camera, or a close-up camera. The electronic device 100 may measure a distance to a subject by including an infrared projector and/or an infrared receiver. The camera module 149 may include one or more lenses, an image sensor, and/or an image signal processor. The electronic device 100 may further include a front camera for photographing a subject in the same direction as the first region A1 of the display 103. For example, the front camera may be disposed around the first region A1 or in a region overlapping the display 103, and when disposed in the region overlapping the display 103, the front camera may photograph a subject through the display 103.

An indicator of the electronic device 100 may be disposed on the first structure 101 or the second structure 102 and may provide state information of the electronic device 100 as a visual signal by including a light-emitting diode. A sensor module of the electronic device 100 may generate an electrical signal or a data value corresponding to an internal operating state of the electronic device 100 or an external environmental state. The sensor module may include a proximity sensor, a fingerprint sensor, or a biometric sensor an iris/face recognition sensor or a heart rate monitor (HRM) sensor). The sensor module may further include at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 3:
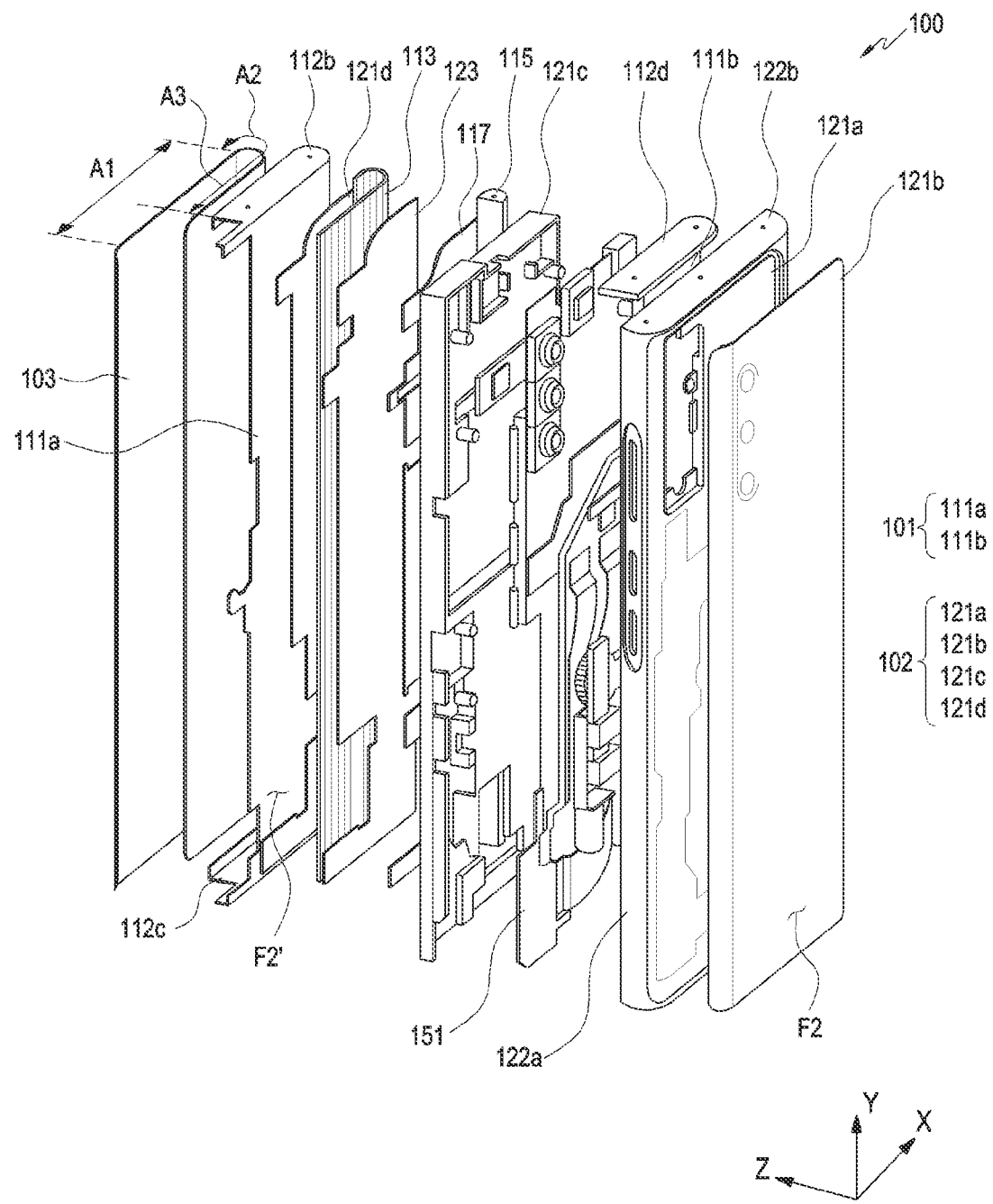
FIG. 3 is an exploded perspective view illustrating the electronic device according to an embodiment.

FIG. 3 is an exploded perspective view illustrating an electronic device according to an embodiment.

In FIG. 3 and subsequent figures, a spatial coordinate system defined by the X-axis, the Y-axis, and the Z-axis orthogonal to each other is illustrated. The X-axis may represent the width direction of the electronic device 100, the Y-axis may represent the longitudinal direction of the electronic device 100, and the Z-axis may represent the height (or thickness) direction of the electronic device 100. Herein, the first direction indicates a direction parallel to the Z-axis, and the third direction indicates a direction parallel to the X-axis. The direction indicated by arrow ① and described above with reference to FIGS. 1 and 2 may be the same as the third direction.

Referring to FIG. 3, the electronic device 100 may include a first structure 101 and a second structure 102 described above with reference to FIGS. 1 and 2 (or collectively, the housing H in FIGS. 1 and 2), and a flexible display 103, and may include a support member 113, a guide member 115 (e.g., a hemisphere or a roller), and/or a support plate 117 disposed in an internal space of the housing. In the electronic device 100, at least one of the above-mentioned components may be omitted or other components may be additionally included.

The first structure 101 may include a first plate 111a (e.g., a slide plate) Referring to FIG. 3, the first structure 101 may further include a first bracket 111b mounted on the first plate 111a. The first plate 111a and/or the first bracket 111b may be composed of a metal material and/or a non-metal material (e.g., a polymer). The first plate 111a may be a portion defining the overall outer shape of the first structure 101, and the first bracket 111b may be a portion forming the internal structure of the first structure 101. The first plate 1111a may be coupled to the first bracket 111b and mounted on the second structure 102 to be linearly reciprocable in one direction (e.g., the width direction (the X-axis direction) of the electronic device 100) while being guided by the second structure 102.

The first structure 101 may include a $(1\text{-}1)^{th}$ side wall 112a, a $(1\text{-}2)^{th}$ side wall 112b, and a $(1\text{-}3)^{th}$ side wall 112c extending from the first plate 111a, and the first bracket 111b may be disposed such that at least a part thereof is surrounded by the first plate 111a, the $(1\text{-}1)^{th}$ side wall 112a, and the $(1\text{-}2)^{th}$ side wall 112b, and the $(1\text{-}3)^{th}$ side wall 112c. The first bracket 111b may include a first side portion 112d extending to face the $(1\text{-}2)^{th}$ side wall 112b and/or a second side portion extending to face the $(1\text{-}3)^{th}$ side wall 112c and parallel to the first side portion 112d. Recesses (or rail structures) extending along the width direction of the electronic device 100 may be provided on the inner surfaces of the first side portion 112d and the second side portion. Protrusions of the support member 113 may be inserted into the recesses, or protrusions of the second bracket 121c included in the second structure 102 may be inserted into the recesses so that a sliding movement of the first structure 101 with respect to the second structure 102 can be implemented. The first bracket 111b may be configured as one body with the first plate 111a. For example, the first bracket 111b may configure an inner surface portion of the first plate 111a. The first bracket 111b may be integrated with the side portion of the housing. The sizes and shapes of the first plate il1a and the first bracket 111b may vary and may be appropriately designed in consideration of the assembly structure or manufacturing process of a product.

The second structure 102 may include a second plate 121a (e.g., a fixed plate or a rear case). Referring FIG. 3, the second structure 102 may further include a third plate 121b (e.g., a rear window), a second bracket 121c, and a fourth plate 121d (e.g., a front case). The second plate 121a may be parallel to the first plate 111a, may face the first plate 111a, and may define the external shape of the second structure 102. In addition, the second plate 121a may substantially provide the overall external shape of the electronic device 100. The second structure 102 may include a $(2\text{-}1)^{th}$ side wall 122.a extending from the second plate 121a, a $(2\text{-}2)^{th}$ side wall 122b provided substantially perpendicular to the $(2\text{-}1)^{th}$ side wall 122a while extending from the second plate 121a, and a $(2\text{-}3)^{th}$ side wall 122c in provided parallel to the $(2\text{-}2)^{th}$ side wall 122b while extending from the second plate 121a. The $(2\text{-}1)^{th}$ side wall 122a, the $(2\text{-}2)^{th}$ side wall 122b, and the $(2\text{-}3)^{th}$ side wall 122c may be configured as one body with the second plate 121a.

The third plate 121b may be coupled to the outer surface of the second plate 121a and may be manufactured integrally with the second plate 121a. The second plate 121a may be composed of a metal or polymer material, and the third plate 121b may be composed of a metal, glass, a synthetic resin, or ceramic to provide a texture different from that of the second plate 121a in the exterior of the electronic device 100. A decorative effect may be provided to the exterior of the electronic device 100 by using the third plate 121b. The second plate 121a and/or the third plate 121b may be composed of a material that at least partially transmits light. For example, in the electronic device 100, by using a portion of the display 103 (e.g., the second region A2) or another display provided in addition to the display 103, a sub-display region may be provided via the second plate 121a and/or the third plate 121b to output visual information.

The second bracket 121c may be composed of a metal material and/or a non-metal material (e.g., a polymer), and may be coupled to the second plate 121a (e.g., the rear case), the $(2-1)^{th}$ side wall 122a, the $(2-2)^{th}$ side wall 122b, and/or the $(2-3)^{th}$ side wall 122c to define the internal space of the second structure 102. The first region A1 of the display 130 may be supported on one surface of the second bracket 121c, and a PCB 151 may be supported on the other surface.

In at least one surface of the second bracket 121c, at least one wall structure may be provided to protrude from an edge and/or an inner portion of the second bracket 121c. For example, the PCB 151 may be firmly seated by the wall structure protruding from the inner portion of the second bracket 121c or extending along the periphery of the edge of the second bracket 121c. By providing the second bracket 121c, it is possible to provide a site in which the PCB 151 or various electronic components can be stably mounted. It is also possible to provide an electromagnetic shielding structure to the internal space of the second structure 102 or to improve the mechanical rigidity of the second structure 102.

A processor, a memory, and/or an interface may be mounted on the PCB 151. The processor may include one or more of a central processing unit, an application processor, a graphics processor, an image signal processor, a sensor hub processor, or a communication processor. The memory may include a volatile memory or a nonvolatile memory. The interface may include a high-definition multimedia interface (HDMI), a USB interface, a secure digital (SD) card interface, and/or an audio interface. The interface may electrically or physically connect the electronic device 100 to an external device, and may include a USB connector, an SD card/an MMC connector, or an audio connector.

The fourth plate 121d may be disposed between the display 103 and the second bracket 121c and may have a flat plate shape composed of a metal or polymer material. The fourth plate 121d may be coupled to one surface of the second bracket 121c to face the first region A1. The fourth plate 121d may be configured substantially as one body with the second bracket 121c.

The display 103 is a flexible display based on an OLED and is at least partially deformable into a curved shape while being generally maintained in a flat shape. The first region A1 of the display 103 may be mounted on or attached to the first surface F1 of the housing to maintain a substantially flat plate shape. The second region A2 extends from the first region A1 and may be supported on or attached to a support member 113. For example, the second region A2 may extend along the sliding direction of the first structure 101, may be accommodated inside the second structure 102 together with the support member 113, and may be deformed into an at least partially curved shape according to the deformation of the support member 113.

In the second state illustrated in FIG. 2, substantially the most region (e.g., the first region A1 and the second region A2) of the display 103 may be exposed to the outside and may to define a plane. Even in the second state of the electronic device 100, one end of the second region A2 may be located to correspond to the guide member 115, and the portion corresponding to the guide member 115 in the second region A2 may be maintained in a curved shape. For example, even when it is stated herein that in the second state of the electronic device 100, the second region A2 is disposed to define a plane, a portion of the second region A2 may be maintained in a curved shape. Similarly, even when it is stated herein that in the first state of the electronic device 100, the support member 113 and/or the second region A2 are accommodated inside the second structure 102, a part of the support member 113 and/or the second region A2 may be located outside the second structure 102.

As the first structure 101 slides on the second structure 102, the area of the display 103 exposed to the outside may vary. The electronic device 100 (or a processor of the electronic device 100) may change the region of the display 103 that is activated based on the area of the display 103 exposed to the outside. For example, in the second state of the electronic device 100 or in the intermediate state of the electronic device 100, the electronic device 100 may activate the region exposed to the outside of the housing in the total area of the display 103 (e.g., the first portion of the display 103). In the first state of the electronic device 100, the electronic device 100 may activate the first region A1 of the display 103 and deactivate the second region A2 of the display 103. However, the disclosure is not limited thereto. For example, in the first state of the electronic device 100, when there is no user input for a predetermined time (e.g., 30 seconds or 2 minutes), the electronic device 100 may deactivate the entire region of the display 103. When the entire region of the display 103 is deactivated, the electronic device 100 may provide visual information through a sub-display region (e.g., a portion of the second plate 121a and/or the third plate 121b composed of a material that transmits light) by activating a partial region of the display 103 as needed (e.g., providing a notification or a missed call/message arrival notification according to a user setting).

The support member 113 may be configured to support at least a part (e.g., the second region A2) (or the second region A2 and the third region A3) of the display 103. The support member 113 may be disposed at one end side of the first structure 101 adjacent to the $(1-1)^{th}$ side wall 112a. The support member 113 may include a plurality of bars (or rods). The bars may have a predetermined width and height, may extend in a straight line along the longitudinal direction (e.g., the Y-axis direction) of the electronic device 100, and may be disposed parallel to the guide member 115. At least some of the plurality of bars may be arranged side by side in the width direction of the electronic device 100 (e.g., the X-axis direction) (or the direction in which the first structure 101 slides). The cross section of the bars may have various shapes including, for example, a circular shape and a quadrilateral shape. The height (the vertical length) of the support member 113 may be equal to the height of one bar, and the width (the horizontal length) of the support member 113 may be proportional to the number of successively connected bars. The support member 113 is configured by continuously assembling the plurality of bars in a direction perpendicular to the longitudinal direction (e.g., the Y-axis direction) of the electronic device, and connecting portions of the bars are configured as, for example, joints. Thus, the support member 113 may have a multi-joint structure configured by arranging several joints side by side. Since the support member 113 has the multi-joint structure, at least a part of the shape of the support member 113 may be deformable (e.g., rollable) during the operation of the electronic device (e.g., the sliding movement of the first structure 101 with respect to the second structure 102). For example, as the first structure 101 slides with respect to the second structure 102, the plurality of bars may be arranged to define a curved shape or a flat shape. As the first structure 101 slides, a portion of the support member 113 located in a portion that faces the guide member 115 may define a curved surface, and another portion of the support member 113 located in a portion that does not face the guide member 115 may define a flat surface (hereinafter, referred to as a flat portion of the support member 113). The flat portion of the support member 113 may face one surface of the first plate 111a and/or one surface of the support plate 117. For example, in the first state of the electronic device 100, the flat portion of the support member 113 may face one surface (the inner surface) of the first plate 111a. In the second state of the electronic device 100, the flat portion of the support member 113 may face one surface of the support plate 117. The second region A2 of the display 103 may be disposed and supported on the support member 113 and may be exposed to the outside of the housing in the second state of the electronic device 100 as illustrated in FIG. 2. In this case, the support member 113 may support or maintain the second region A2 of the display 103 in a flat state by defining a substantially flat surface.

In response to the slide operation of the first structure 101 with respect to the second structure 102, the support member 113 may also move with respect to the second structure 102. In the first state of the electronic device 100 (e.g., the state illustrated in FIG. 1), the support member 113 may be substantially accommodated in the second structure 102. In contrast, in the second state of the electronic device 100 (e.g., the state illustrated in FIG. 2), the support member 113 may be substantially drawn out of the second structure 102. However, the disclosure is not limited thereto. Even in the first state of the electronic device 100, a portion of the support member 113 may not be accommodated inside the second structure 102. For example, even in the first state of the electronic device 100, a portion of the support member 113 may be disposed at a position adjacent to the guide member 115 outside the second structure 102. One end of the support member 113 may be connected to the second bracket 121c and/or the fourth plate 121d. Accordingly, when one end of the support member 113 is fixed, only the other end of the support member 113 may be movable in response to the sliding operation of the first structure 101 with respect to the second structure 102.

The second structure 102 may accommodate electronic components (e.g., an antenna for near field communication (NFC), a wireless power charging (WPC) antenna, or a magnetic secure transmission (MST) antenna) in a space in which the second structure 102 does not overlap the support member 113.

The guide member 115 may include a rigid material and may have a configuration extending long in the longitudinal (Y-axis) direction of the electronic device 100. The guide member 115 may be disposed at a position adjacent to one end side of the first structure 101, for example, the $(1-1)^{th}$ side wall 112a, and may be configured to support the rear surface of the support member 113 and guide the movement of the support member 113. Opposite ends of the guide member 115 may be coupled and fixed to the $(1-2)^{th}$ side wall 112b and the $(1-3)^{th}$ side wall 112c of the first structure 101. Accordingly, when the first structure 101 slides with respect to the second structure 102, the guide member 115 may also move together with the first structure 101. A gap may be provided between the guide member 115 and the first plate 111a, in which gap at least a part of the display 103 (e.g., the second region A2, and/or the third region A3) and at least a part of the support member 113 may be located. The portions of the display 103 and the support member 113 adjacent to the guide member 115 may define a curved shape corresponding to the cross-sectional shape of the guide member 115.

The guide member 115 may be configured in a cross section of a circular sector shape. For example, the guide member 115 may have a cross section of a circular sector shape (a semicircle shape) having a central angle of 180 degrees and may have a shape in which the center of the arc of the circular sector is oriented in the width (X-axis) direction of the electronic device. The support member 113 may move while sliding along the outer periphery of the guide member 115. The guide member 115 may include a roller. For example, the roller may be disposed at a position adjacent to the $(1-1)^{th}$ side wall 112a and may be mounted to be rotatable inside the first structure 101. The roller may be provided in replacement of or in addition to the circular sector-shaped guide member 115. For example, the roller has a rotation axis that rotates about a direction parallel to the longitudinal direction of the electronic device 100, and the guide member 115 may be configured to more easily guide the movement of the support member 113 by the rotation of the roller when the roller supports the rear surface of the support member 113.

When the display 103 is deformed into a curved shape, the guide member 115 can maintain the curvature radius of the display 103 to a certain degree, thereby suppressing excessive deformation of the display 103 or preventing the display 103 from being damaged. The excessive deformation indicates that the display 103 is deformed to have an excessively small radius of curvature to the extent that pixels or signal wires included in the display 103 are damaged. For example, the display 103 may be damaged due to excessive deformation or physical friction while being moved or deformed. Since the electronic device 100 includes the guide member 115 having the cross section of the circular sector shape and the roller in addition to or in replacement of the same, it is possible to prevent the display 103 from being damaged due to excessive deformation or physical friction.

For example, when the guide member 115 includes the roller, the roller may rotate while the display 103 and the support member 113 are accommodated inside or drawn out of the second structure 102. At this time, the friction between the support member 113 and the guide member 115 may be reduced by the roller, and thus the operation of accommodating or drawing out the first structure 101 with respect to the second structure 102 can be performed more smoothly.

The support plate 117 may be configured to support a portion of the display 103. For example, the support plate 117 may be provided to support the second region A2, which is a portion to be expanded or contracted in the display 103. When it is described herein that a first component supports a second component, this includes when the first component comes into direct contact with and supports the second component and when a third component is interposed between the first component and the second component such that the first component indirectly supports the second component. For example, the support plate 117 may directly or indirectly support the second region A2 of the display 103. In the second state of the electronic device 100, the support member 113 may be positioned between the support plate 117 and the second region A2 of the display 103, and the support plate 117 may indirectly support the second region A2 of the display 103 via the support member 113.

The support plate 117 may be composed of a rigid material, for example, such as a metal or polymer. In this case, the support plate 117 may be configured to slide in one direction (e.g., the width direction of the electronic device (the X-axis direction)) together with the guide member 115 in the state of being coupled to one side of the guide member 115. The support plate 117 may be provided such that one surface of the support plate 117 faces the one surface of the second bracket 121c. Alternatively, the support plate 117 may be provided such that at least a portion thereof is accommodated in or drawn out of the second bracket 121c. The support plate 117 may be provided to be movable in the space between the second bracket 121c and the fourth plate 121d. For example, in the first state of the electronic device 100, the support plate 117 may be accommodated in the space between the second bracket 121c and the fourth plate 121d to be substantially covered by the fourth plate 121d, and in the second state of the electronic device, the support plate 117 may be drawn out of the space between the second bracket 121c and the fourth plate 121d. The second bracket 121c and/or the fourth plate 121d may be configured to support the first region A1 of the display 103 in all of the first state, the intermediate state, and the second state of the electronic device 100 in the state of being fixed in position, and the support plate 117 may be configured to be slidable together with the guide member 115 so as to support the second region, which is a region to be expanded in the display 103, in the intermediate state and the second state of the electronic device 100.

The support plate 117 may be manufactured in the form of a sheet including a flexible and somewhat resilient material, such as an elastic material of silicon or rubber. When the support plate 117 is manufactured in the form of a sheet, the support plate 117 may be mounted on or attached to the guide member 115 to be selectively wound around the roller of the guide member 115 when the roller rotates. When the roller rotates, the support plate 117 may be rolled around the outer periphery of the roller or may be spread out from the roller in a flat shape between the support member 113 and the second bracket 121c.

In the second state of the electronic device 100, the support plate 117 may be oriented in the first direction (e.g., the Z-axis direction) and may provide the front surface of the first structure 101 so that the second region A2 of the display 103 can be substantially supported and seated thereon. In the second state of the electronic device 100, the first plate 111a may be oriented in a second direction opposite to the support plate 117 and may substantially provide a rear surface F2' of the first structure 101. In the second state of the electronic device 100, the second bracket 121c and/or the fourth plate 121d may be oriented in the first direction (e.g., the Z-axis direction) and may provide the front surface of the second structure 102 so that first region A1 of the display 103 can be supported and seated thereon. In the second state of the electronic device 100, the second plate 121.a and/or the third plate 121b may be oriented in the second direction opposite to the second bracket 121c and/or the fourth plate 121d and may substantially provide a rear surface F2 of the second structure 102. Accordingly, the support plate 117 may be referred to as a first front plate, the first plate 111a may be referred to as a first rear plate, the second bracket 121c and/or the fourth plate 121d may be referred to as a second front plate, and the second plate 121a and/or the third plate 121b may be referred to as a second rear plate.

The electronic device 100 may further include a shielding member 123 to block electromagnetic interference between the display 103 and electronic components disposed inside the housing. The shielding member 123 may be disposed on the rear surface of the display 103 between the fourth plate 121d and the support member 113. The shielding member 123 may be mounted on or attached to the rear surface of the fourth plate 121d. When, for example, the fourth plate 121d and the shielding member 123 are laminated with each other, a region of the shielding member 123 that does not overlap the fourth plate 121d may be utilized as a substrate on which at least one conductive line and/or electronic component may be disposed.

The electronic device 100 may further include a connection member that connects a portion of the first structure 101 to the second structure 102. The connection member may include at least one link structure. For example, at least one link structure as the connection member may include a first arm and a second arm that are foldable to each other at ends thereof, wherein the opposing end of the first arm may be connected to the guide member 115 and the opposing end of the second arm may be connected to the second bracket 121c. When the first structure 101 slides with respect to the second structure 102, the connection member may prevent the first structure 101 from excessively departing from the second structure 102 and may serve to prevent sagging of the components supporting the display 103 (e.g., the support member 113 and/or the support plate 117).

The electronic device 100 may include a driving unit as a means for increasing the user's convenience when expanding or contracting the display. For example, the driving unit may include at least one motor. The driving unit may be provided on one side edge of the first structure 101 to provide power for sliding the first structure 101 with respect to the second structure 102. The electronic device 100 may further include a rail structure (e.g., a rack gear) engaged with the driving unit, and the rotating motion of the driving unit may be converted in a linear motion of the first structure 101 using the rail structure.

The electronic device 100 may include a sensor module configured to detect an operating state of the electronic device 100 or an external environmental state (e.g., a user state) and to generate an electrical signal or a data value corresponding to the detected state. The sensor module may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. In addition, the electronic device 100 may further include a sensor configured to detect how much the display 103 is expanded. For example, in the electronic device, depending on the expanded or contracted length (or region) of the display, a user interface (UI) or current consumption may be changed, and a touch recognition range may also be changed. That is, in the electronic device, it may be important to measure the expanded or contracted length of the display due to the rolling of the display and to output a screen corresponding to the expanded or contracted display based on the measurement. Accordingly, the electronic device 100 may further include a sensor configured to detect the expanded or contracted length of the display 103.

For example, as the sensor configured to detect the expanded or contracted length of the display 103, the electronic device 100 may include a sensor configured to detect the expanded or contracted length of the display 103 based on the number of rotations of the roller or the driving unit, or the rotating angles of the arms included in the connection member. The electronic device 100 may also include a sensor configured to measure the moving distance of the display by measuring magnetic flux generated from a magnet mounted on a portion the guide member 115) of the first structure 101. The electronic device 100 may include a sensor configured to measure the distance between the basic position of the display 100 and the position when the display is expanded or contracted by calculating the travel time of light using an optical sensor (e.g., a time-of-flight (ToF) sensor). Various types of sensors for detecting the expanded or contracted length of the display 103 may be included.

The electronic device 100 may include a book cover-type rollable electronic device in which, as in the embodiment illustrated in FIGS. 1 to 3, the first structure 101 and the second structure 102 have a similar height and the internal structures of the first structure 101 (e.g., a bracket and/or electronic components) move with the display 103 when the first structure 103 slides with respect to the second structure 102. However, the electronic device 100 is not limited to this example and may include a table-type rollable device in which, unlike the embodiment illustrated in FIGS. 1 to 3, substantially only the display 103 moves when the first structure 101 slides with respect to the second structure 102.

Figure 4:
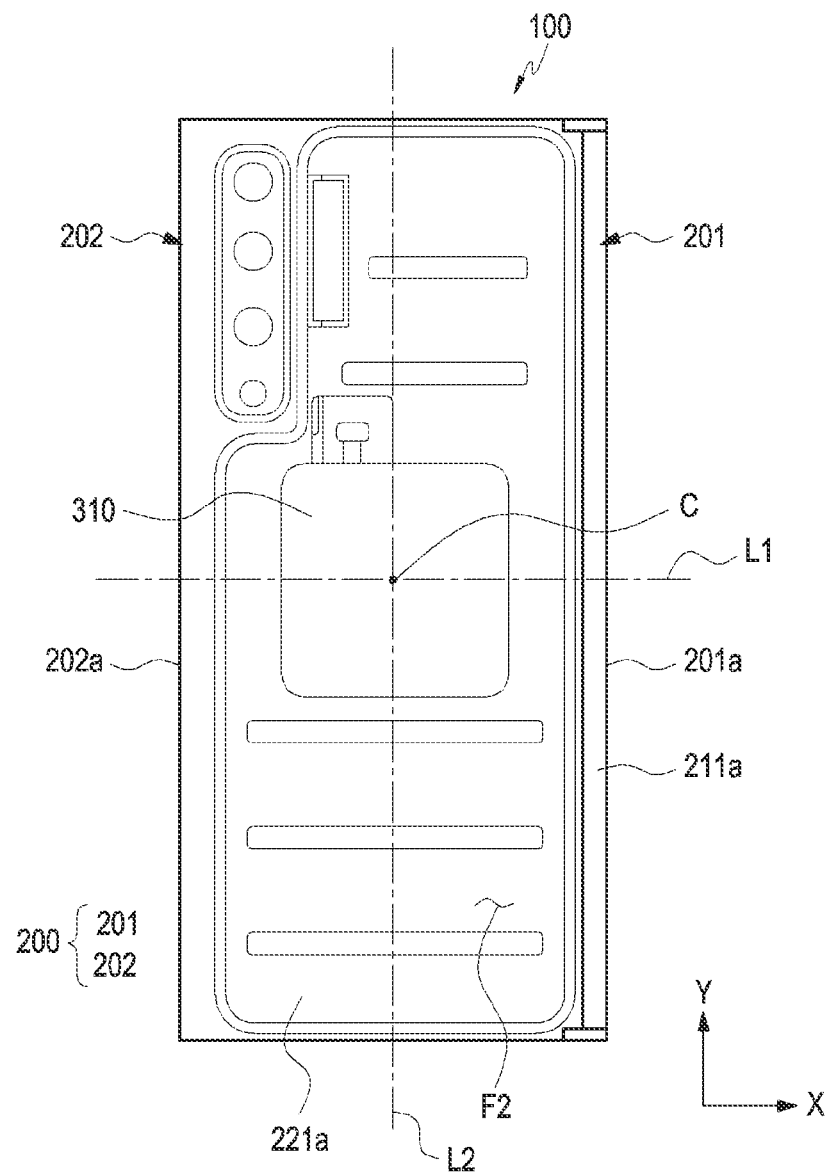
FIG. 4 illustrates an electronic device when a first structure is accommodated in a second structure, according to an embodiment.
Figure 5:
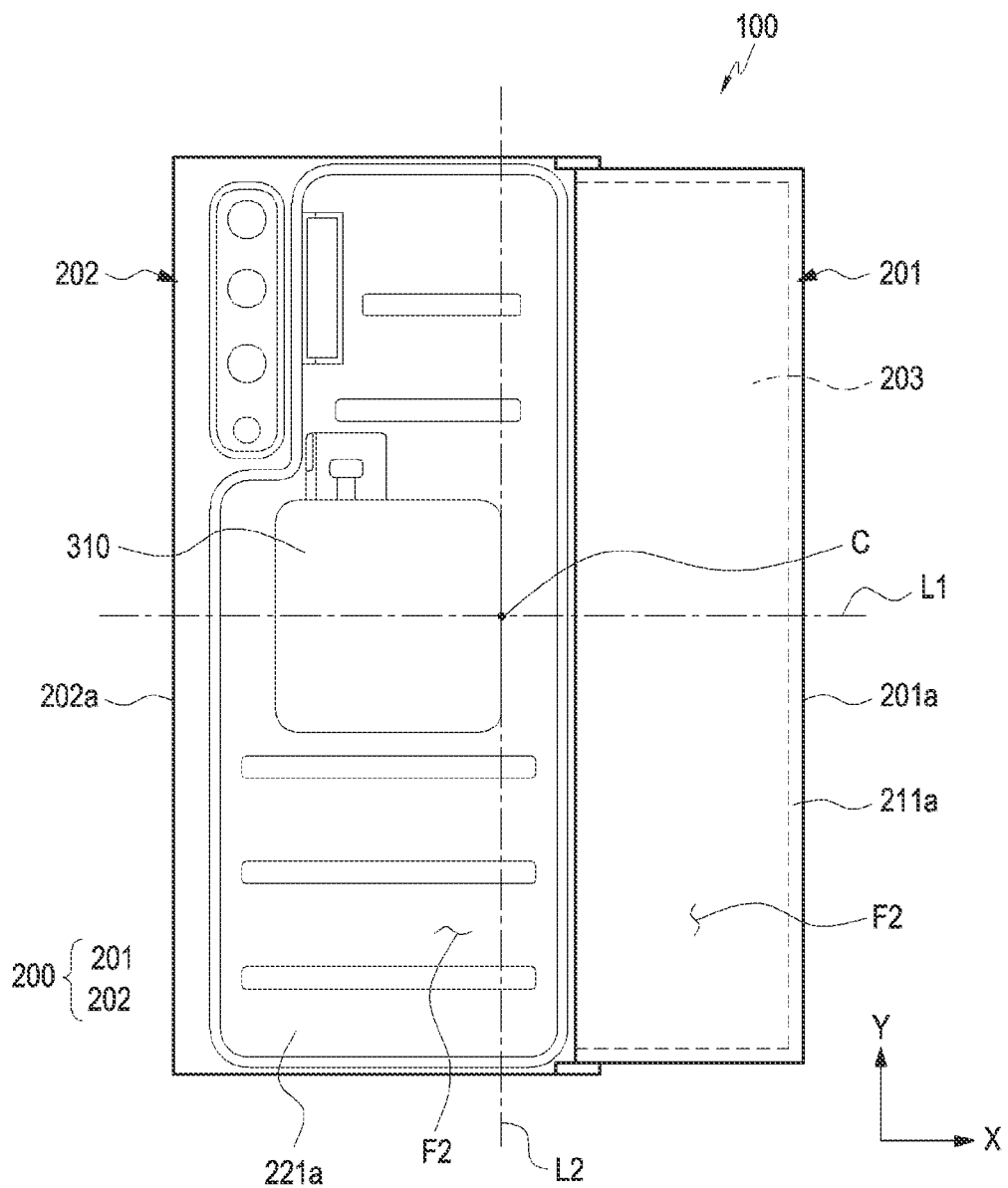
FIG. 5 illustrates when the first structure is drawn out of the second structure in the electronic device illustrated in FIG. 4, according to an embodiment.

FIG. 4 illustrates an electronic device 100 when the first structure 201 is accommodated in the second structure 202, according to an embodiment. FIG. 5 illustrates when the first structure 201 is drawn out of the second structure 202 in the electronic device illustrated in FIG. 4, according to an embodiment.

The electronic device 100 may include a first structure 201 and a second structure 202, The first structure 201 may be referred to as a first housing, a slide unit, or a slide housing, and may be disposed to be reciprocable on the second structure 202. The second structure 202 may be referred to as, for example, a second housing, a main unit, or a main housing, and may accommodate various electrical and electronic components such as a PCB and a battery.

A portion A1 of the display 203 (e.g., the first region A1 in FIG. 3) may be seated on the first structure 201. When the first structure 201 moves (e.g., slides) with respect to the second structure 202, another portion of the display 203 (e.g., the second region A2 in FIG. 3) may be accommodated inside the second structure 202 (e.g., a slide-in operation) or exposed to the outside of the second structure 202 (e.g., a slide-out operation). Here, a portion of the display 203 (e.g., the first region A1 in FIG. 3) may be a basic use region when the display 203 is in the slid-in state, and another portion of the display 203 (e.g., the second region A2 in FIG. 3) may be an expanded region in the slid-out state. In FIG. 4, another portion of the display 203 (e.g., the second region A2 in FIG. 3) may be accommodated inside the electronic device in the state of being wound by a guide member (e.g., 115 in FIG. 3) provided inside the electronic device, and may be unwound from the guide member (e.g., 115 in FIG. 3) to be exposed to the outside of the electronic device as in the embodiment illustrated in FIG. 5 in the state in which the display region of the display 203 is expanded.

The first structure 201 and the second structure 202 may configure one housing 200. As illustrated in FIGS. 1 to 3, the first structure 201 (e.g., the first housing) may be physically separated from the second structure 202 (e.g., the second housing), wherein, when the display region of the display 203 is expanded, the first structure 201 may protrude to the outside from the second structure 202. However, when the first structure 201 is configured as a substantially single housing 200 with the second structure 202, the width of the housing 200 may be widened when the display region of the display 203 is expanded.

The first structure 201 may include a first plate 211a (e.g., a slide plate), and the second structure 202 may include a second plate 221a (e.g., a fixed plate or a rear case). In the second state of the electronic device 100, the first plate 211a and the second plate 221a may provide the second surface F2 and F2' of the electronic device 100. The second structure 202 may further include a third plate (e.g., the third plate 121b in FIG. 3) (e.g., the rear window) that covers the components in the internal space and defines the exterior of the electronic device.

In FIGS. 4 and 5, the housing 200 may include a first side surface 201a surrounding at least a part of the first surface and the second surface of the housing 200 and a second side surface 202a facing away from the first side surface. The definitions for the first side surface 201a and the second side surface 202a are not limited to those in the embodiment illustrated in FIGS. 4 and 5. The first side surface 201a and the second side surface 202a may refer to the edges of the housing located at the right and left sides with reference to the center C of the housing. However, the disclosure is not limited thereto, and the first side surface 201a and the second side surface 202a may refer to other edges of the housing, such as edges located at the upper and lower sides with reference to the center C of the housing. The display of the electronic device 100 may be expanded through an operation in which the first side surface 201a of the housing 200 moves away from the center C of the housing. The display of the electronic device 100 may be contracted through an operation in which the first side surface 201a of the housing 200 approaches the center C of the housing 200. The state in which the first side surface 201a of the housing 200 is spaced farthest from the center C of the housing may be defined as a second state (e.g., an open state) of the electronic device, and the state in which the first side surface 201a is located closest to the center C of the housing may be defined as a first state (e.g., a closed state) of the electronic device.

Figure 6:
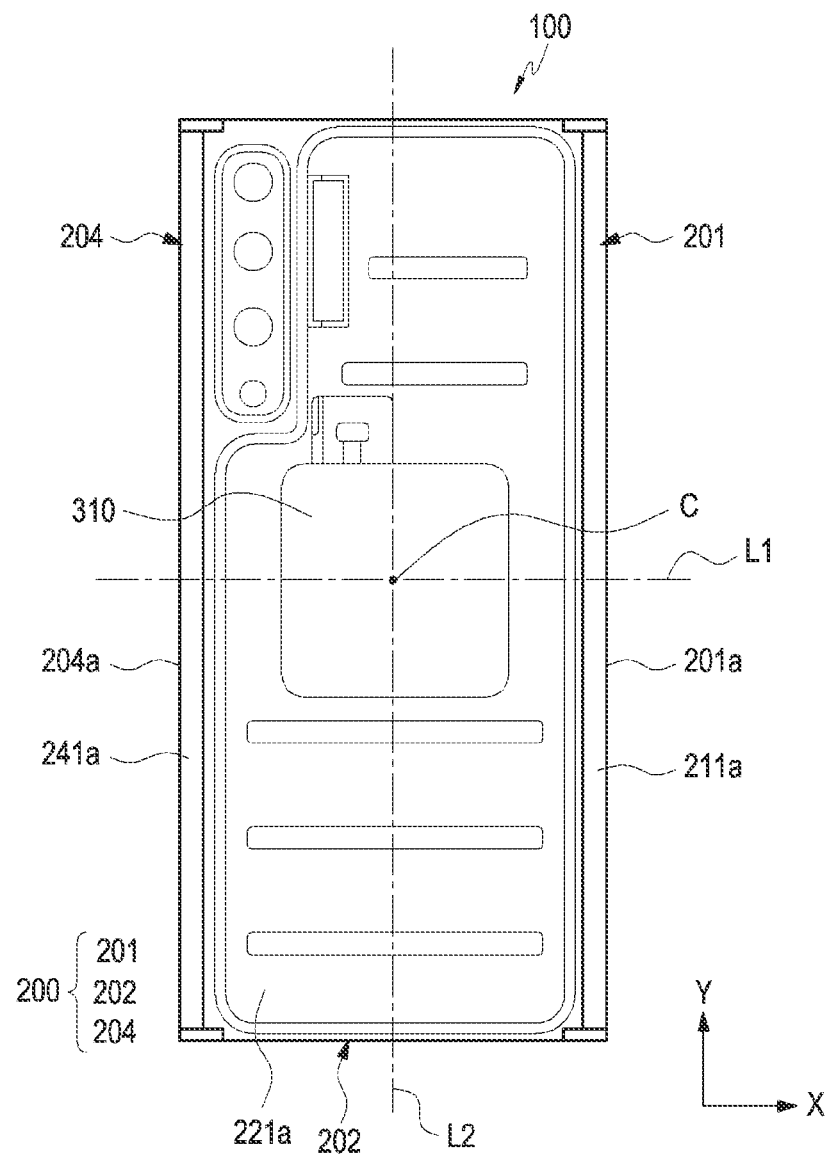
FIG. 6 illustrates an electronic device when the first structure is accommodated in the second structure, according to an embodiment.
Figure 7:
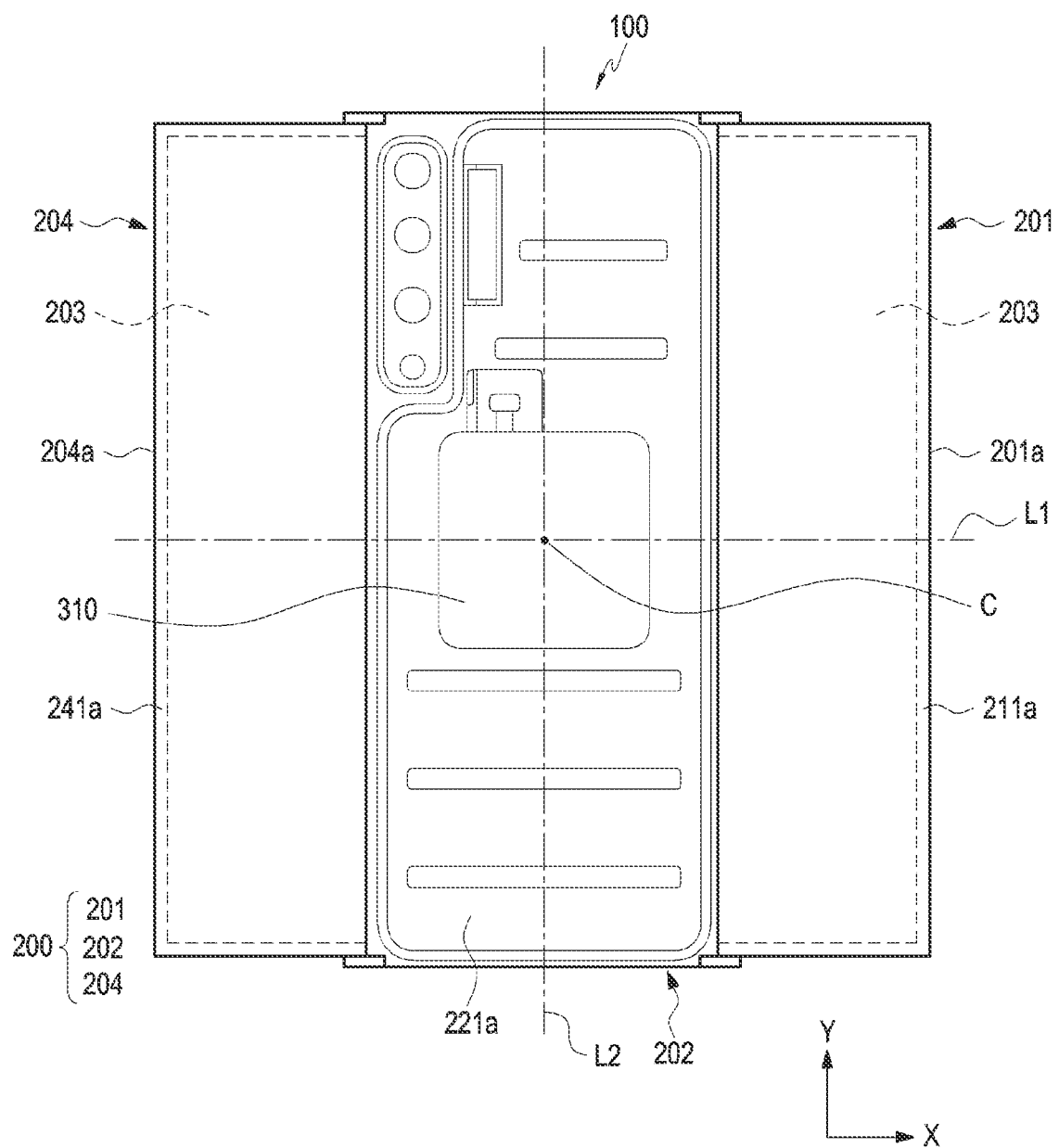
FIG. 7 illustrates when the third structure is drawn out of the second structure in the electronic device illustrated in FIG. 6, according to an embodiment.

FIG. 6 illustrates an electronic device 100 when the first structure 201 is accommodated in the second structure 202, according to an embodiment. FIG. 7 illustrates the electronic device of FIG. 6, when the third structure 204 is drawn out of the second structure 202, according to an embodiment.

In the following description made with reference to the figures, the description overlapping the description of the embodiment of FIGS. 1 to 5 will be omitted.

The electronic device 100 may include a first structure 201, a second structure 202, and a third structure 204. Referring to FIGS. 6 and 7, the first structure 201 may be referred to as, for example, a first housing, a first slide unit, or a first slide housing, and may be disposed to be reciprocable on the second structure 202. The second structure 202 may be referred to as, for example, a second housing, a main unit, or a main housing, and may accommodate various electrical and electronic components such as a PCB and a battery. The third structure 204 may be referred to as a third housing, a second slide unit, or a second slide housing, and may be disposed to be reciprocable on the second structure 202.

A portion of the display 203 (e.g., the first region A1) may be seated on the first structure 201 and the third structure 204 When the first structure 201 moves (e.g., slides with respect to the second structure 202, another portion of the display 203 (e.g., the second region A2) may be accommodated inside the second structure 202 (e.g., a slide-in operation) or exposed to the outside of the second structure 202 (e.g., a slide-out operation). When the third structure 204 moves (e.g., slides) with respect to the second structure 202, another portion of the display 203 (e.g., the second region A2) may be accommodated inside the second structure 202 (e.g., a slide-in operation) or exposed to the outside of the second structure 202 (e.g., a slide-out operation). In FIG. 6, another portion of the display 203 (e.g., the second region A2) may be accommodated inside the electronic device in the state of being wound by a guide member (e.g., 115 in FIG. 3) provided inside the electronic device, and may be unwound from the guide member (e.g., 115 in FIG. 3) to be exposed to the outside of the electronic device as in the embodiment illustrated in FIG. 7 in the state in which the display region of the display 203 is expanded.

The first structure 201, the second structure 202, and the third structure may configure, for example, one housing 200. The first structure 201 may include a first plate 211a (e.g., a slide plate), the second structure 202 may include a second plate 221a (e.g., the second plate 221 in FIG. 3) (e.g., a fixed plate or a rear case), and the third structure 204 may include a fifth plate 241a (e.g., a slide plate). The fifth plate 241a may have a size and shape symmetrical to those of the first plate 211.a with respect to the center C of the housing. The second structure 202 may further include a third plate (e.g., the third plate 121b in FIG. 3) (e.g., the rear window) that covers the components in the internal space of the electronic device. The housing 200 may include a first surface oriented in a first direction and a second surface facing away from the first surface. Here, the first surface and the second surface of the housing 200 may be defined by some of the surfaces defined by the first plate 211a, the second plate 221a, and the fifth plate 241a.

Referring to FIGS. 6 and 7, the housing 200 may include a first side surface 201a surrounding at least a part of the first surface and the second surface of the housing 200 and a second side surface 204a facing away from the first side surface. Different than the embodiment illustrated in FIGS. 4 and 5, FIGS. 6 and 7 illustrate when each of the first side surface 201a and the second side surface 204a may move away from the center C of the housing so that the display can be expanded. In the electronic device 100, the display may be expanded when the first side surface 201a of the housing 200 moves away from the center C of the housing. In replacement of or in addition to this, the display may also be expanded through an operation in which the second side surface 202a of the housing 200 moves away from the center C of the housing. In contrast, in the electronic device 100, the display may be contracted by the first side surface 201a of the housing 200 approaching the center C of the housing. In replacement of or in addition to this, the display may also be contracted through an operation in which the second side surface 202a of the housing 200 approaches the center C of the housing. The operation of expanding or contracting the display through the movement of the first side surface 201a and the operation of expanding or contracting the display through the movement of the second side surface 204a may be performed independently of each other. The state in which the first side surface 201a and/or the second side surface 204a of the housing 200 are spaced farthest from the center C of the housing may be defined as a first state (e.g., an open state) of the electronic device, and the state in which the first side surface 201a and/or the second side surface 204a are located closest to the center C of the housing may be defined as a second state (e.g., a closed state) of the electronic device.

Referring to FIGS. 4 to 7, in the electronic device 100, the antenna module 310 may be disposed at a position adjacent to the second surface of the housing 200.

The antenna module 310 may include an antenna having at least one function. The antenna may include, for example, a near field communication (NEC) antenna, a wireless power charging (WPC) antenna, or a magnetic secure transmission (MST) antenna.

A wireless charging antenna may be described herein as an antenna included in the antenna module 310. Accordingly, the antenna module 310 will be referred to as a wireless charging module 310 for convenience of description, but it should be noted that the scope of the disclosure is not limited to the wireless charging antenna.

A battery providing power may be provided inside the electronic device 100. The wireless charging module 310 is configured to receive power from a charging device (e.g., a wireless charging pad) provided outside the electronic device 100 to charge the battery. The wireless charging module 310 may include a wireless power charging (WPC) antenna coil having a loop shape and may charge a battery using an electromagnetic induction phenomenon between an external charging device (e.g., a wireless charging pad) and the WPC antenna coil. The wireless charging module 310 may exhibit high charging efficiency when the center of the external charging device (e.g., a wireless charging pad) coincides with the center of the WPC antenna coil.

The wireless charging module 310 may be disposed adjacent to the second surface of the electronic device 100. The term adjacent may include when a certain element is located close to or substantially in contact with another element when spaced apart from the other element by a predetermined distance. In addition, it should be noted that the term adjacent includes disposing a certain element close to another element but does not exclude disposing another element between the certain element and the other element. The electronic device 100 may display an image or a picture through a display (e.g., 203 in FIG. 5) disposed on the first surface, or may perform a charging operation using the wireless charging module 310 disposed adjacent to the second surface while displaying a charging state.

The wireless charging module 310 may be fixedly disposed inside the housing of the electronic device 100, the wireless charging module 310 may be fixedly disposed at the center C of the housing of the electronic device 100. In FIGS. 4 to 7, a point at which an imaginary line L1 and an imaginary line L2, which are orthogonal to each other, meet is indicated to be located at the center C of the housing of the electronic device 100. The user may charge the power of the electronic device 100 when the center of the electronic device 100 is aligned with an external charging device (e.g., a wireless charging pad). However, as illustrated in FIG. 5, when the display is expanded and the width of the housing is expanded, the wireless charging module 310 is not located at the center C of the housing but is located at a position eccentric from the center C of the housing. In this case, even if the user aligns the center C of the housing of the electronic device 100 having the expanded width with the center of the external charging device (e.g., a wireless charging pad), the wireless charging operation may not be performed well since the center of the wireless charging module 310 and the center of the external charging device (e.g., a wireless charging pad) are misaligned from each other.

The following provides embodiments for securing high charging efficiency even when the width of the housing 200 of the electronic device 100 is expanded and thus the display region of the display is expanded. Disclosed are embodiments in which the wireless charging module 310 slides to ensure high charging efficiency. By providing the wireless charging module 310 to be slidably movable, the wireless charging module 310 may be aligned in the middle of the width of the housing even when the display is expanded.

Referring to FIGS. 4 to 7 it may be possible to expand the display using at least one side surface of the housing 200 and to expand the width of the electronic device 100 following the same. The following embodiments will regard the display being expanded and the width of the electronic device 100 being expanded using one side surface 201a of the housing 200 as illustrated in FIGS. 4 and 5, but the disclosure is not limited thereto.

Figure 8:
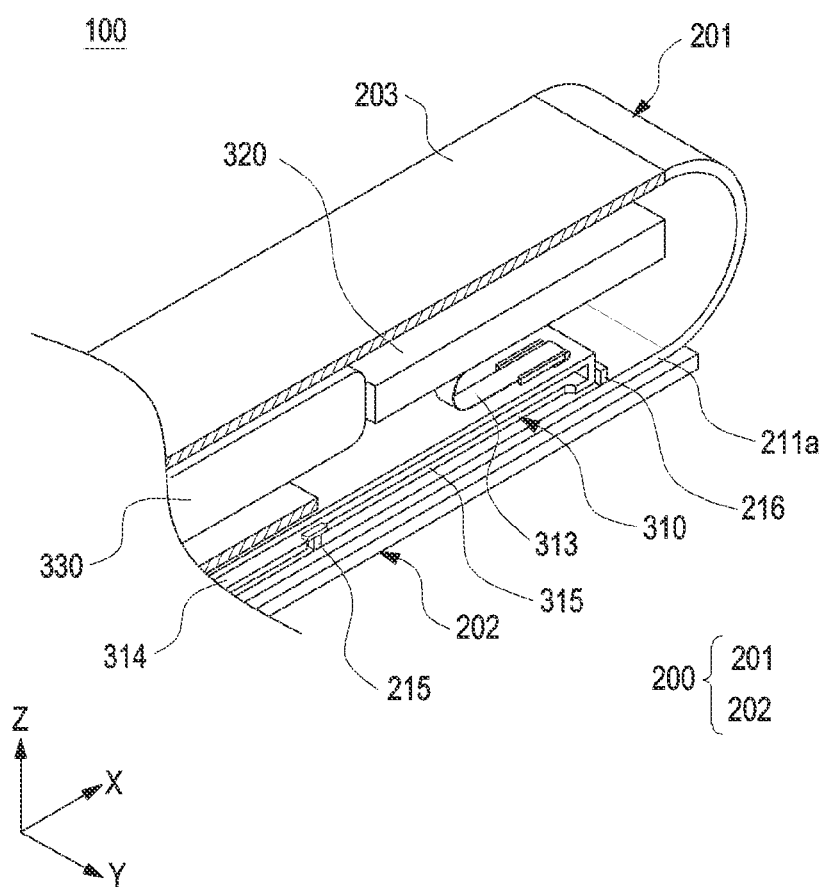
FIG. 8 is an internal perspective view illustrating the inside of an electronic device when a wireless charging module is disposed, according to an embodiment.
Figure 9:
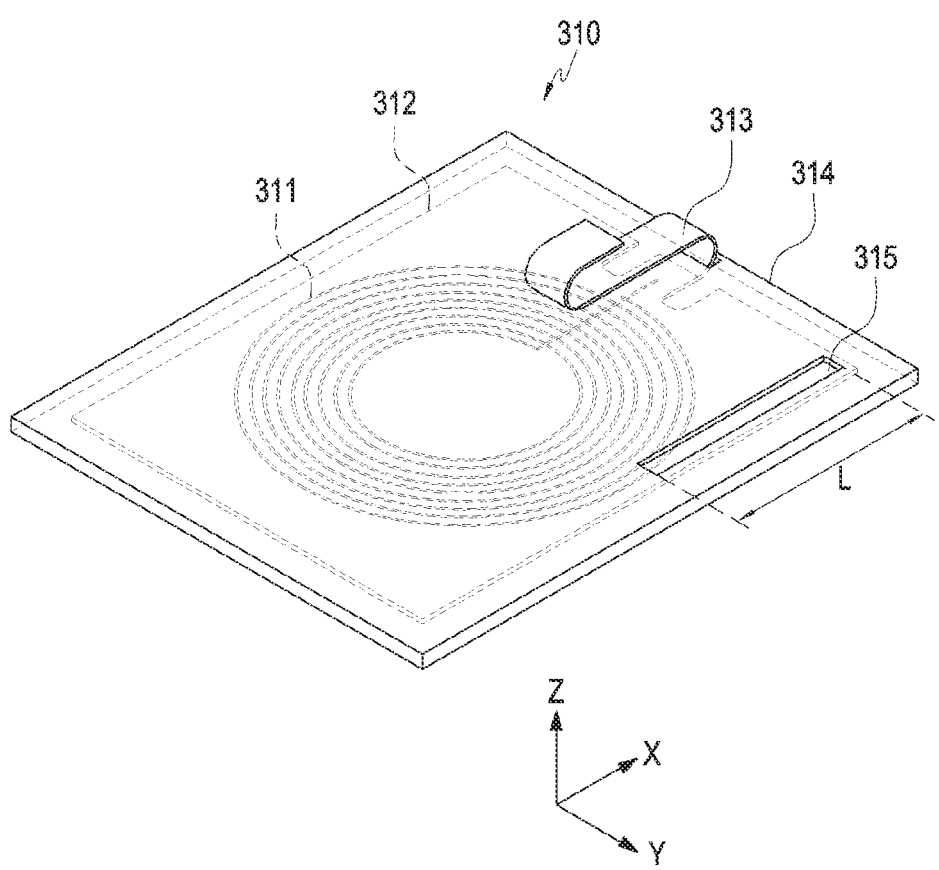
FIG. 9 is a perspective view illustrating a wireless charging module according to an embodiment.

FIG. 8 is an internal perspective view illustrating the inside of an electronic device when a wireless charging module 310 is disposed, according to an embodiment. FIG. 9 is a perspective view illustrating a wireless charging module 310 according to an embodiment.

Referring to FIG. 8, the electronic device 100 may include a housing 200 including a first structure 201 and a second structure 202, and a display 203 exposed through the first surface of the housing 200. In addition, the electronic device 100 may include a plurality of electronic components or a PCB in the internal space surrounded by the housing 200. For example, a PCB 330 and a battery 320 as an electronic component may be disposed in the internal space of the electronic device 100. The type and number of electronic components are not limited even though a description thereof will be omitted herein.

The electronic device 100 may include a wireless charging module 310 disposed adjacent to the second surface of the housing 200. As described above with reference to the embodiment illustrated in FIGS. 4 to 7, here, the second surface of the housing 200 may be any one of the second surface F2' defined by the first plate 211a, the second surface F2 defined by the second plate 221a, and the surface defined by the third plate (e.g., the third plate in FIG. 3). The wireless charging module 310 may be disposed adjacent to the second surface of the housing 200 to be connected to the battery 320 via a connection member.

In describing the arrangement relationship between the components of the first structure 201 and the second structure 202 as illustrated in FIG. 8 and subsequent figures, the first plate 211a and the second plate 221a may be briefly illustrated and described, and the illustration and description of other components may be omitted for convenience. For example, in FIG. 8 and subsequent figures, as the components defining the exterior of the housing 200 of the electronic device 100, the first structure 201 including the first plate 211a, the second structure including the second plate 221a, and the display 203 are illustrated, but the housing 200 of the electronic device 100 may further include the components described in the above-described embodiments in FIGS. 1 to 7.

In FIG. 8, an embodiment in which the wireless charging module 310 is disposed on the inner surface of the first plate 211a is illustrated. The position at which the wireless charging module 310 is disposed inside the housing 200 is not limited to a certain embodiment as long as the wireless charging module 310 is disposed adjacent to the second surface of the housing 200 and is configured to be slidable in the width direction of the housing 200 (e.g., the X-axis direction). In FIGS. 4 to 7, it may be preferable to locate the wireless charging module 310 according to an embodiment at the center C of the housing 200. In addition, the following embodiments will be mainly described with reference to the case in which the initial installation position of the wireless charging module 310 is disposed at the center of the housing 200. However, the position of the wireless charging module 310 is not necessarily limited thereto. In the electronic device 100 including a slidable wireless charging module 310 according to various embodiments of the disclosure, it should be noted that the wireless charging module 310 may not necessarily be located at the center of the housing 200, Referring to FIGS. 8 and 9 together, the electronic device 100 may include a connection member configured to connect the wireless charging module 310 to the battery 320. An FPCB 313 may be included as an example of the connection member. By using the FPCB 313, even if the wireless charging module 310 slides inside the housing 200, the connection between the wireless charging module 310 and the battery 320 can be maintained.

The wireless charging module 310 may include a wireless charging antenna (or a wireless power charging (WPC) antenna) 311 and a substrate 312. The connection member (e.g., the FPCB 313) may extend from the substrate 312. The wireless charging antenna 311 corresponds to a wireless power reception coil provided to correspond to a wireless power transmission coil of an external charging device and may be configured to charge a battery through electromagnetic induction with the wireless power transmission coil of the external charging device. The substrate 312 may be provided to mount the wireless charging antenna 311, and the FPCB 313 may be configured to transmit the power received via the wireless charging antenna 311 by being connected to one side of the substrate 312.

In addition, the wireless charging module 310 may further include a module mounting unit 314 surrounding at least a part of the wireless charging antenna 311. The module mounting unit 314 may be configured to protect the wireless charging antenna 311, the substrate 312, and/or the FPCB 313 from an external impact and guide a sliding movement of components included in the wireless charging module 310, in the internal space of the housing 200. To this end, the module mounting unit 314 may surround at least a part of the wireless charging antenna 311, the substrate 312, and the FPCB 313. The module mounting unit 314 may be configured in the form of a box in which at least a part of the wireless charging module can be accommodated in the internal space.

Since the module mounting unit 314 moves when the display region of the display 203 is expanded or contracted, the positions of the wireless charging antenna 311, the substrate 312, and the FPCB 313 may be variable. For example, when the display region of the display 203 is expanded, the module mounting unit 314 may move from the initial position in a direction in which the width of the housing 200 of the electronic device 100 is expanded. As a result, the positions of the wireless charging antenna 311, the substrate 312, and the FPCB 313 are moved in the direction in which the width of the housing 200 of the electronic device 100 is expanded.

As another example, when the display region of the display 203 is contracted, the module mounting unit 314 may move from the expanded position in a direction in which the width of the housing 200 is contracted. As a result, the positions of the wireless charging antenna 311, the substrate 312, and the FPCB 313 are moved in the direction in which the width of the housing 200 is contracted.

The electronic device 100 may further include a hook structure 215 as a means for fixing the position of the module mounting unit 314 when the display region of the display 203 is expanded or contracted when the module mounting unit 314 moves in response to the expansion or contraction of the display region of the display 203. The hook structure 215 may be implemented using the module mounting unit 314 and a part of the structure of the housing 200 of the electronic device 100.

The hook structure 215 may be provided to protrude from the inner surface of the housing so as to be engageable with at least one recess provided in the module mounting unit 314.

For example, in FIG. 8, at least one recess 315 is formed in one surface of the module mounting unit 314 in the width direction of the housing (e.g., the X-axis direction), and the hook structure 215 protruding from the one surface of the first plate 211a may be configured to be engageable with the at least one recess 315 when the display is expanded or contracted.

The electronic device 100 may further include a side wall structure 216 configured to move the wireless charging module 310 in response to the contraction of the display 203 separately from the hook structure 215. The side wall structure 216 will be described in detail with reference to FIG. 13 and subsequent figures.

Figure 10:
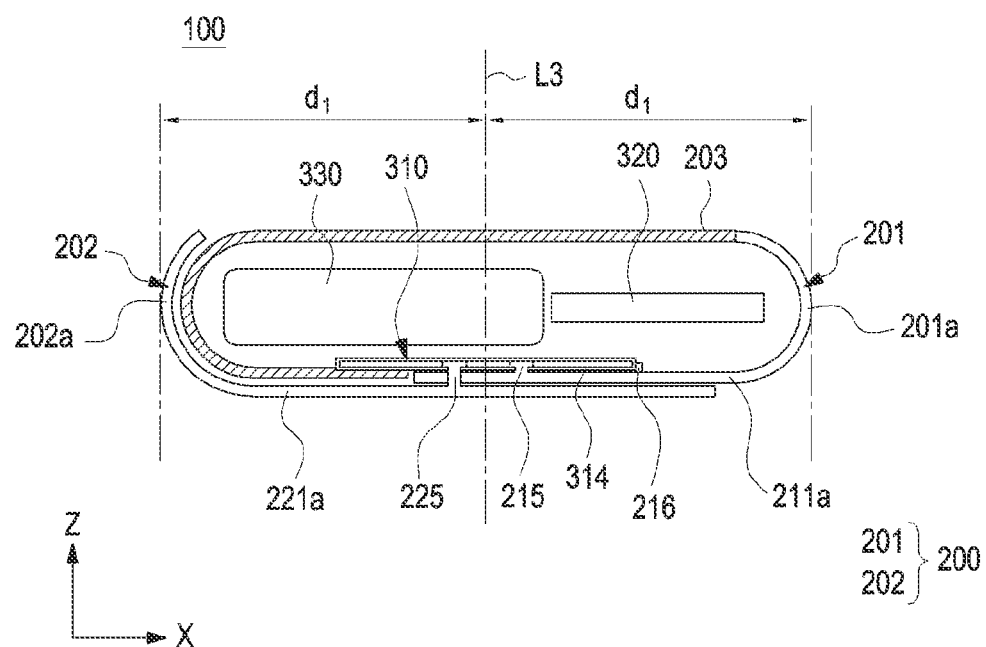
FIG. 10 illustrates a first (closed) state of the electronic device according to an embodiment.
Figure 11:
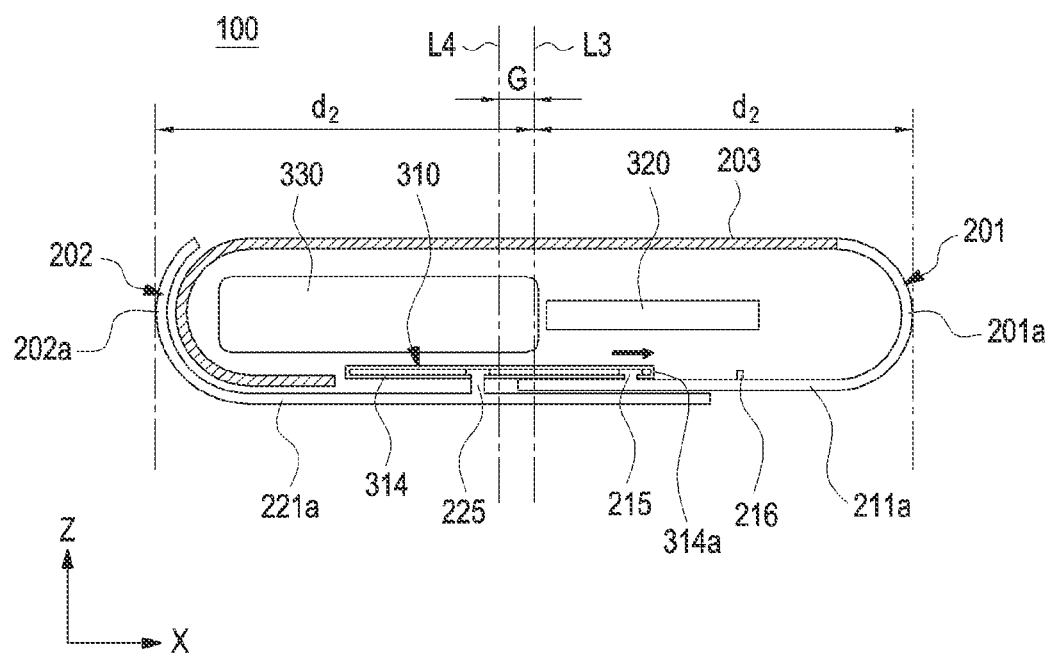
FIG. 11 illustrates when a hook structure operates in response to a sliding operation of a display according to an embodiment.
Figure 12:
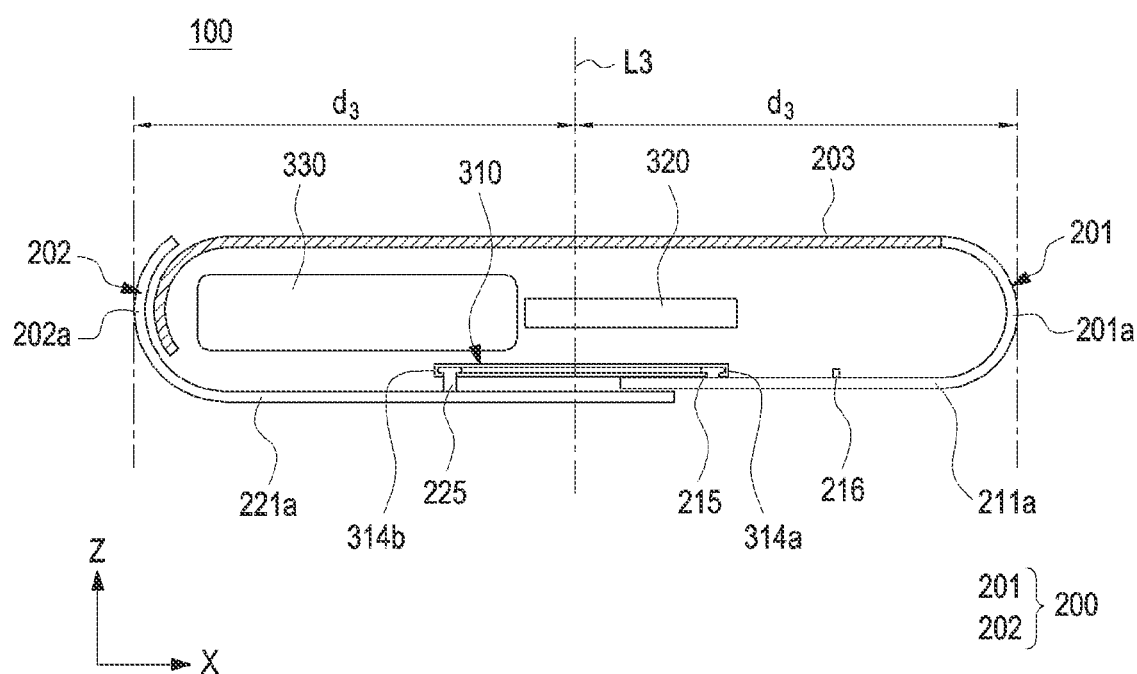
FIG. 12 illustrates a second (open) state of the electronic device according to an embodiment.

FIG. 10 illustrates when the electronic device 100 is closed, according to an embodiment. FIG. 11 illustrates when hook structures 215 and 225 operate in response to the sliding operation of the display 203 according to an embodiment. FIG. 12 illustrates when the electronic device 100 is opened, according to an embodiment. FIG. 10 illustrates an initial state before the display region of the display 203 is expanded. FIG. 11 illustrates an intermediate state in which the display region of the display 203 is expanded, and FIG. 12 illustrates an open state after the display region of the display 203 is maximally expanded.

In FIGS. 10 to 12, an imaginary line L3 passing through the center of the width of the housing 200 is indicated. FIG. 10 illustrates a view in which with reference to the imaginary line L3, the distance to the end (e.g., 201a) of the first structure 201 and the distance to the end 202a of the second structure 202 are $d_1$. FIG. 11 illustrates a view in which with reference to the imaginary line L3, the distance to the end (e.g., 201a) of the first structure 201 and the distance to the end 202a of the second structure 202 are $d_2$ that is greater than $d_1$. FIG. 12 illustrates a view in which with reference to the imaginary line L3, the distance to the end (e.g., 201a) of the first structure 201 and the distance to the end 202a of the second structure 202 are $d_3$ that is the maximum expandable distance. Referring to FIGS. 10 to 12 together, a recess (e.g., the recess 315 in FIGS. 8 and 9) may be provided at one side of the module mounting unit 314, and the hook structures 215 and 225 provided on the inner surface of the housing 200 may be configured to be engageable with the recess 315. The hook structures 215 and 225 may include a first hook structure 215 provided on the inner surface (e.g., the inner surface of the first plate 211a) of the first structure 201 configured to slide when the display is expanded or contracted, and a second hook structure 225 provided on the inner surface of the second structure 202 (e.g., the inner surface of the first plate 211a), wherein, different than the first hook structure 215, the position of the second hook structure 225 is fixed even when the display is expanded.

As illustrated in FIG. 10, the first hook structure 215 may be configured to be movable in the width direction of the housing (the X-axis direction) along the recess 315 in the state of being accommodated in the recess (e.g., the recess 315 in FIGS. 8 and 9). In FIG. 10, when the electronic device 100 is closed, the center of the wireless charging module 310 may correspond to the center of the width of the housing 200.

referring FIG. 11, when the display region of the display 203 is expanded, the first structure 201 is slidable along the width direction of the housing (the X-axis direction), and along with this, the first hook structure 215 provided on the inner surface of the structure 201 also moves in the direction in which the width of the housing is expanded (the X-axis direction), At this time, as the first structure 201 slides along the width direction of the housing (the X-axis direction), a gap G may be provided between the center of the width of the housing (e.g., the center of the width of the housing through which the virtual line L3 passes) and the center of the wireless charging module 310 (e.g., the center of the wireless charging module through which the virtual line L4 passes). The first hook structure 215 may come in contact with one end 314a of the module mounting unit 314 after moving a predetermined distance within the recess 315. When the first structure 201 further slides in the width direction of the housing (the X-axis direction), the first hook structure 215 presses the one end 314a of the module mounting unit 314, and thus the wireless charging module 310 moves in the direction in which the width of the housing is expanded together with the first hook structure 215 (the X-axis direction).

When the expansion of the display region of the display 203 stops (when the sliding movement of the first structure 201 stops), the movement of the first hook structure 215 provided on the inner surface of the first structure 201 and the movement of the module mounting unit 314 may also be interrupted.

When the display region of the display 203 is maximally expanded as illustrated in FIG. 12, the second hook structure 225 and the other end 314b of the module mounting unit 314 may come into contact with each other. Accordingly, the movement of the wireless charging module 310 in the width direction of the electronic device (the X-axis direction) may be restricted.

As illustrated in FIGS. 10 to 12, the electronic device 100 may provide hook structures 215 and 225 configured to move the wireless charging module 310 in response to the expansion of the display region of the display 203. The hook structures 215 and 225 may have various shapes. For example, the end of each of the hook structures 215 and 225 may be configured in a hanging structure. In addition, for example, the end of each of the hook structures 215 and 225 is not necessarily formed in the hanger structure but may have a shape in which teeth 215a are provided on the outer periphery thereof, in the manner of a sprocket. In the above description, an embodiment in which at least one recess (e.g., the recess 315 in FIGS. 8 and 9) is provided in the module mounting unit 314 and the hook structures 215 and 225 provided on the inner surface of the housing are accommodated in the recess has been described. However, the scope of the disclosure is not limited thereto, and there may be variable embodiments for the hook structures 215 and 225 and the recess. The first hook structure 215 and the second hook structure 225 may be accommodated in the same recess (e.g., the recess 315 in FIGS. 8 and 9) as described above with reference to the embodiment illustrated in FIGS. 10 to 12. However, it should be noted that the hook structures may be accommodated in separate recesses. At least one recess may also be provided in the inner surface of the housing and a hook structure of a type capable of being accommodated in the recess may be provided on the module mounting unit 314.

The recess 315 may have a length of ½ of the maximally expanded length of the width of the housing 200. Referring to FIGS. 9 to 12, the width of the housing 200 may be the minimum ($d_1+d_1$) when the electronic device is closed and may be the maximum ($d_3+d_3$) when the electronic device is opened ½ of the maximally expanded length of the width of the housing 200 may be defined as $d_3-d_1$, which may also be defined as the maximum length in which the wireless charging module 310 is slidable.

Figure 13:
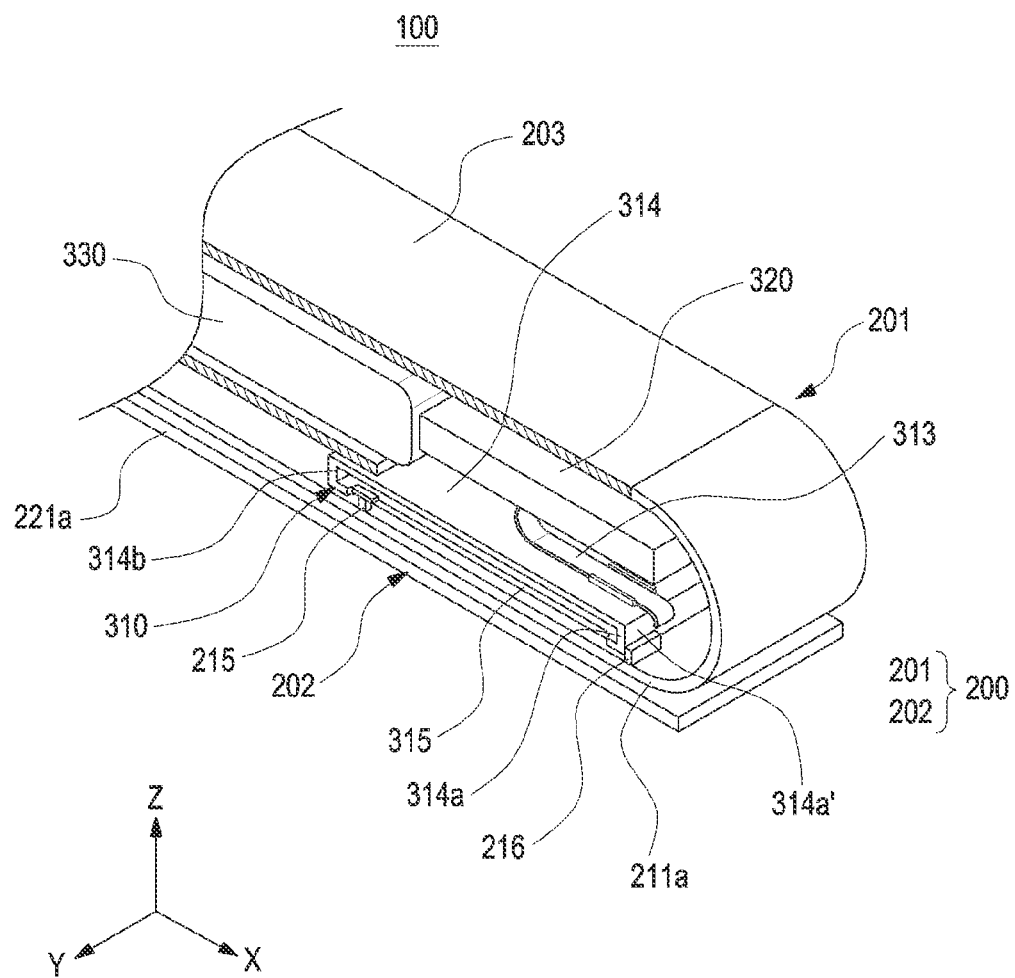
FIG. 13 is an internal perspective view illustrating the inside of an electronic device when a wireless charging module is disposed, according to an embodiment.

FIG. 13 is a perspective view briefly illustrating the inside of an electronic device when a wireless charging module 310 is disposed, according to an embodiment. FIG. 13 may illustrate the internal view of the electronic device in an operation of contracting the display 203 when the display region of the display 203 is maximally expanded.

The electronic device 100 may further include a side wall structure 216 protruding to a predetermined height from the inner surface of the first structure 201 (the slide housing). For example, the side wall structure 216 may be configured to protrude to a height at which one end 314a of the module mounting unit 314 is engageable therewith. When the first structure 201 slides in the width direction of the housing (the direction X-axis or the direction opposite to the X axis) when the display 203 is contracted, the side wall structure 216 may press the module mounting unit 314 in the width direction of the housing 200 (the X-axis direction) the state of being in contact with the outer wall 314a' of one end 314a of the module mounting unit 314. As the side wall structure 216 presses the outer wall 314a' of the one end 314a of the module mounting unit 314, the module mounting unit 314 disposed at a position eccentric from the center of the housing 200 can be moved to the vicinity of the housing 200 by the expansion operation of the display 203.

Figure 14A:
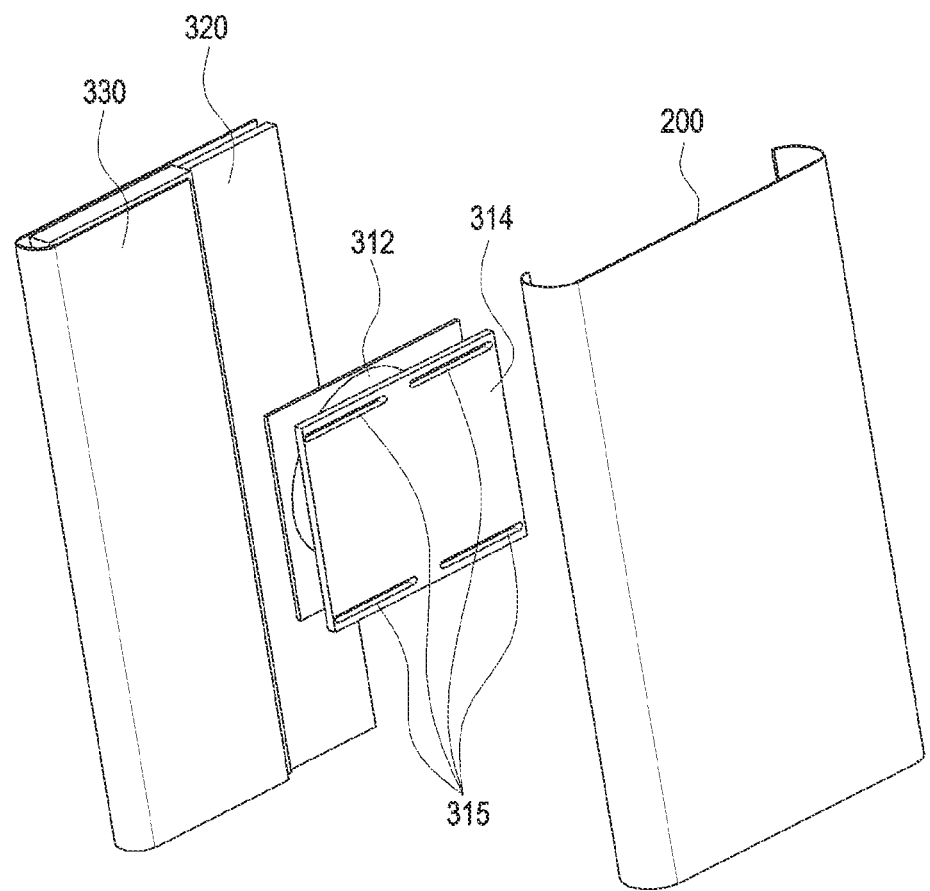
FIG. 14A illustrates the rear surface of a module mounting unit according to an embodiment.
Figure 14B:
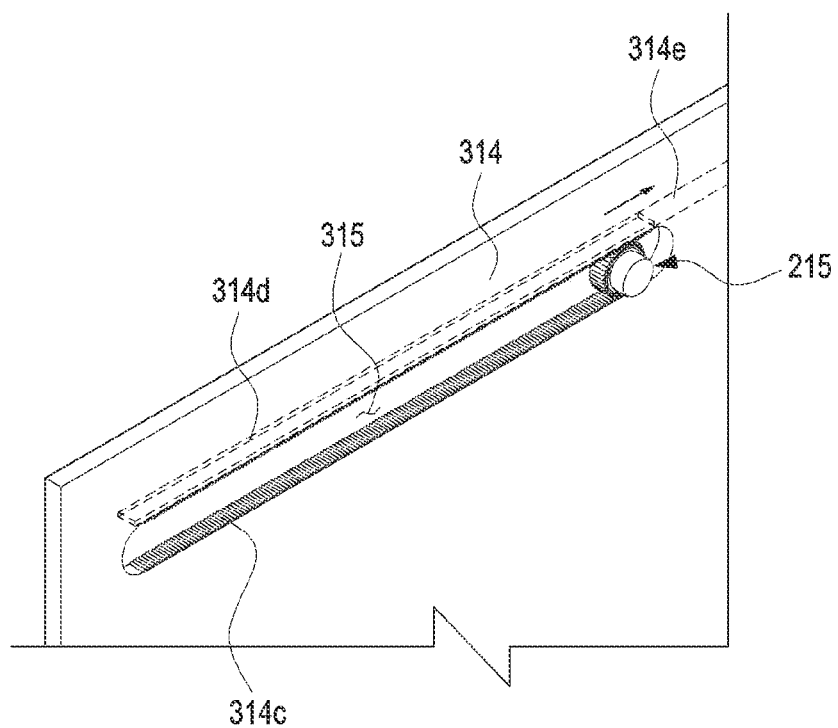
FIG. 14B illustrates a recess provided in the module mounting unit and a protrusion accommodated in the recess, according to an embodiment.
Figure 14C:
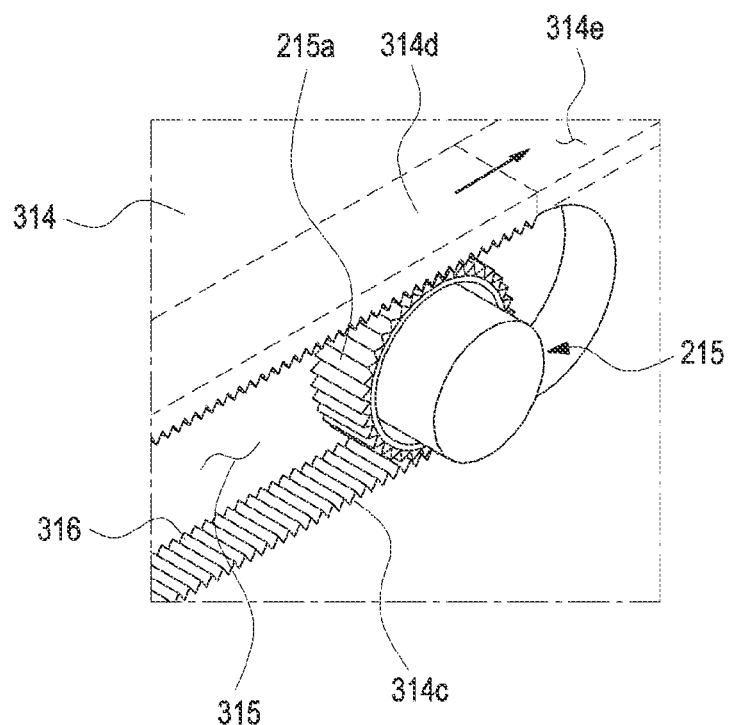
FIG. 14C is an enlarged view illustrating a fastened state between the recess and the protrusion according to the embodiment illustrated in FIG. 14B.

FIG. 14A illustrates the rear surface of the module mounting unit 314 according to an embodiment. FIG. 14B illustrates the recess 315 provided in a module mounting unit 314 and a hook structure (the first hook structure 215) accommodated in the recess 315, according to an embodiment. FIG. 14C is an enlarged view illustrating a fastened state between the recess 315 and the hook structure (e.g., the first hook structure 215) according to the embodiment illustrated in FIG. 14B.

FIGS. 14A to 14C illustrate a portion (the flat portion) of the module mounting unit 314, in which other portions may be omitted. Referring to FIGS. 14A to 14C, at least one recess 315 may be formed in the module mounting unit 314, and at least one hook structure (e.g., the first hook structure 215) engageable with the module mounting unit 314 may be accommodated in and/or fastened to the recess 315 (e.g., the first hook structure 215).

The first hook structure 215 may have a cylindrical shape and may be provided on at least one surface of the recess 315 to be rotatable about the axis thereof.

In addition, the first hook structure 215 may include an outer circumference having a sprocket shape 215a, and teeth 316 corresponding to the outer circumference of the first hook structure 215 to be engageable therewith may be provided in the recess 315. A recess 315 may be provided in the module mounting unit 314 to be long in the width direction of the housing (e.g., the X-axis direction in FIG. 8) and may include a first inner surface 314c and a second inner surface 314d facing the first inner surface 314c, wherein the first and second inner surfaces define the recess 315. One of the first inner surface 314c and the second inner surface 314d may be configured as a rail structure movable in a direction opposite to the movement direction of the first hook structure 215 due to engagement with the first hook structure 215. For example, in FIGS. 14B and 14C, a rail structure may be provided on the second inner surface 314d, and the rail structure may be configured to be movable to the space 314e provided at one side of the module mounting unit 314. In this manner, the first hook structure 215 may rotate about the axis thereof while the first hook structure 215 being engaged with the recess 315 when the display 203 is expanded or contracted. Since the first hook structure 215 is provided to be engaged with the recess 315, a slip phenomenon in which the wireless charging module 310 slides during sliding movement or when the electronic device 100 is tilted can be prevented, and the wireless charging module 310 can be fixed at a specific position.

Figure 15A:
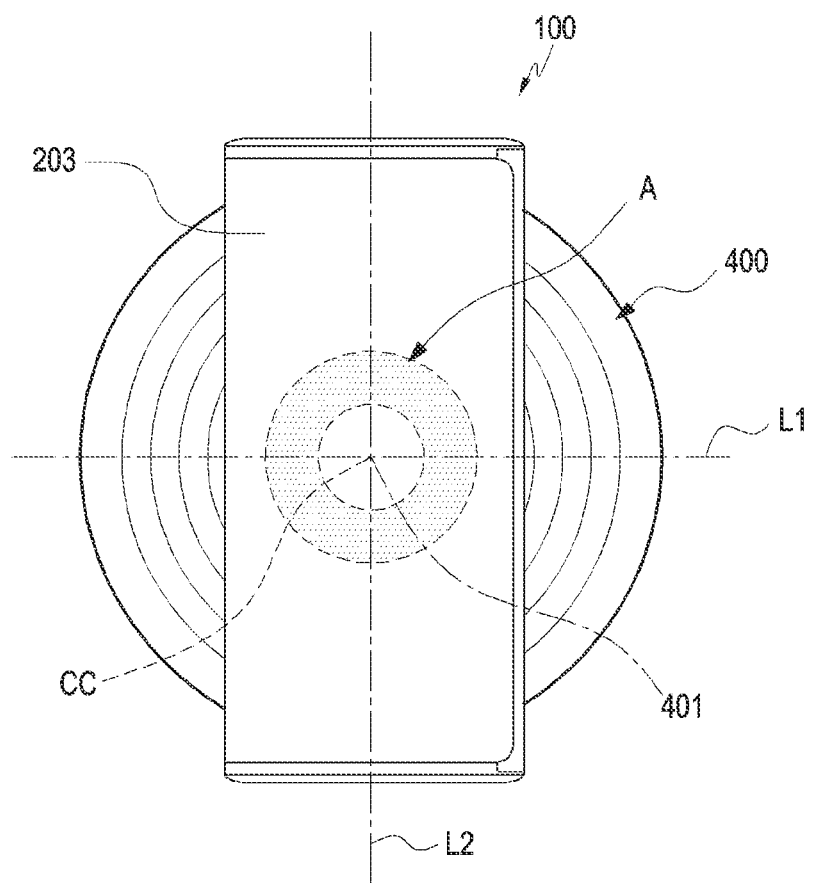
FIG. 15A illustrates when an electronic device is placed on a wireless charging pad to be charged in the first state (according to an embodiment.
Figure 15B:
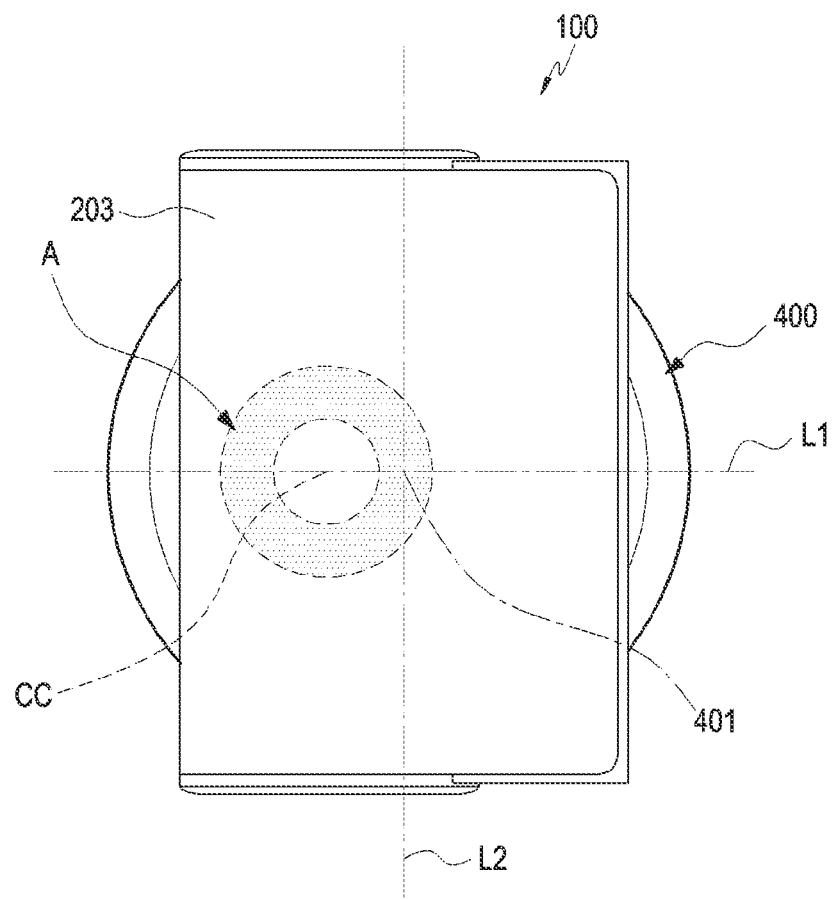
FIG. 15B illustrates when an electronic device is placed on a wireless charging pad to be charged in the second state according to an embodiment.
Figure 15C:
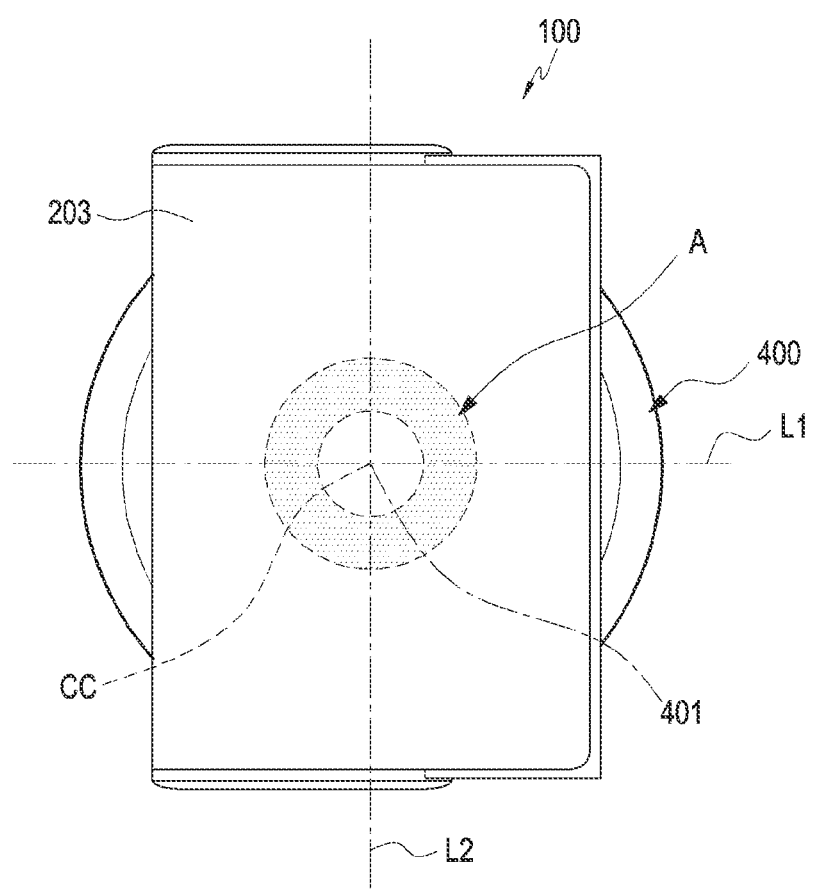
FIG. 15C illustrates when an electronic device is placed on a wireless charging pad to be charged in the second state according to an embodiment.

FIG. 15A illustrates when the electronic device 100 in the closed state is placed on a wireless charging pad 400 to be charged, according to an embodiment. FIG. 15B illustrates when the electronic device 100 in the open state is placed on a wireless charging pad 400 to be charged, according to an embodiment. FIG. 15C illustrates when the electronic device 100 in the open state is placed on a wireless charging pad 400 to be charged, according to an embodiment.

As described above, the state in which one side surface of the housing of the electronic device 100 is spaced farthest from the center of the housing may be defined as an open state of the electronic device, and the state in which the one side surface of the housing of the electronic device 100 is located closest to the center of the housing may be defined as a closed state of the electronic device.

The wireless charging operation of the electronic device 100 may be implemented when the electronic device 100 is placed on an external charging device 400, and when the wireless charging antenna A of the electronic device 100 is located at the center 401 of the external charging device 400, high charging efficiency can be achieved. The user recognizes that the wireless charging antenna A is located at the center of the electronic device 100 and aligns the center of the housing 200 of the electronic device 100 with the center 401 of the external charging device 400.

Referring to FIG. 15A, when the electronic device 100 is closed, the center CC of the wireless charging antenna A may be located at the center of the width of the electronic device 100. In this case, when the user aligns the center of the width of the electronic device 100 with the center 401 of the external charging device 400, the charging operation can be performed with high charging efficiency.

As illustrated in FIG. 15B, when the display region of the display 203 expands and the width of the housing expands, the center CC of the wireless charging antenna A may be provided at a position eccentric from the center 401 of the external charging device 400, rather than being located at the center 401 of the external charging device. In this case, since the center CC of the wireless charging antenna A is not aligned with the center 401 of the external charging device 400 even if the user aligns the center of the width of the electronic device 100 with the center of the external charging device 400, the charging operation may be performed when charging efficiency is reduced or the charging operation may not be performed.

Referring to FIG. 15C, since the position of the wireless charging antenna A is variable even when the display region of the display 203 is expanded and the width of the housing is expanded, the center CC of the wireless charging antenna A can be located at the center of the width of the electronic device 100. Therefore, when the user aligns the center of the width of the electronic device 100 with the center 401 of the external charging device 400, the charging operation can be performed with high charging efficiency as in FIG. 15A.

An electronic device herein may be any of various types of devices. The electronic device may include a portable communication device (e.g., a smartphone), a computer device, a portable multimedia device, a portable medical device, a camera, a wearable device, or a home appliance. The electronic device according to an embodiment disclosed herein is not limited to the above-described devices.

In addition, electronic devices disclosed herein may include a foldable electronic device in which a display is expandable and at least a part of a display can be folded around a folding region, a sliding-type rollable electronic device in which at least a part of a display disposed inside a housing in a first state (or the closed state) of the electronic device can be moved to an expanded state, and a rolling-type rollable electronic device in which at least a part of the display disposed inside a housing in a first state (or the closed state) of the electronic device can be rolled by a roller.

According to various embodiments disclosed herein, it is possible to provide an electronic device (e.g., the electronic device 100 in FIG. 8) including: a housing (e.g., the housing 400 in FIG. 4) including a first surface oriented in a first direction (e.g., a direction parallel to the Z axis in FIG. 8), a second surface oriented in a second direction opposite to the first direction, a first side surface (e.g., the first side surface 201a in FIG. 4) surrounding at least a part of a space between the first surface and the second surface, and a second side surface (e.g., the second side surface 202a in FIG. 4) facing away from the first side surface; a flexible display (e.g., the display 203 in FIG. 8) including a first region (e.g., the first region A1 in FIG. 3) oriented in the first direction and a second region (e.g., the second region A2 in FIG. 3) extending from the first region, wherein the flexible display is configured such that the first region is expandable by causing at least a part of the second region to be oriented in the first direction based on a sliding movement of at least a part of the housing; and an antenna module (e.g., the antenna module 310 in FIG. 8) disposed adjacent to the second surface of the housing, wherein the antenna module includes: a wireless charging antenna; and a module mounting unit (e.g., the module mounting unit 314 in FIG. 9) configured to surround at least a part of the wireless charging antenna and to be movable in an internal space inside the housing such that the wireless charging antenna is located in a center of a width of the housing in response to a state of the electronic device according to expansion or contraction of a display region of the display.

According to various embodiments, the state of the electronic device may include an open state in which the first region of the display is maximized (e.g., the state of the electronic device of FIG. 5) or a closed state in which the first region of the display is minimized (e.g., the state of the electronic device in FIG. 4).

According to various embodiments, the housing may include a main housing (e.g., the second structure 202 in FIG. 8) and a slide housing (e.g., the first structure 201 in FIG. 8) slidably coupled to the main housing, and the electronic device may further include a battery (e.g., the battery 330 in FIG. 8) and a main circuit board (e.g., the main circuit board 320 in FIG. 8) disposed inside the housing.

According to various embodiments, the module mounting unit may further include a substrate on which the wireless charging antenna is mounted (e.g., the substrate 312 in FIG. 9) and an FPCB (e.g., the FPCB 313 in FIG. 9) configured to connect the substrate and the main circuit board to each other.

According to various embodiments, the module mounting unit may be configured in the form of a box capable of accommodating the antenna module in the internal space of the housing.

According to various embodiments, the electronic device may further include a hook structure for moving the module mounting unit in response to the expansion of the display.

According to various embodiments, the module mounting unit may include at least one recess (e.g., the recess 315 in FIG. 8) and may be provided such that a hook structure (e.g., the hook structure 215 in FIG. 8) provided on the inner surface of the housing can be engaged with the at least one recess when the display slides.

According to various embodiments, the hook structure may include: a first hook structure (e.g., the first hook structure 215 in FIG. 8) provided on the inner surface of the slide housing; and a second hook structure (e.g., the second hook structure 225 in FIG. 8) provided on the inner surface of the main housing.

According to various embodiments, the housing may include at least one recess and may be provided such that the hook structure can be engaged with the at least one recess when the display is expanded or contracted.

According to various embodiments, the hook structure may be configured to be rotatable when the display region of the display is expanded or contracted.

According to various embodiments, the outer circumference of the hook structure (e.g., the outer circumference of the hook structure in FIG. 14C) may be provided in a sprocket shape, and the recess may be provided with teeth (e.g., the teeth 316 in FIG. 14C) corresponding to the outer circumference of the hook structure.

According to various embodiments, the recess may have a length of ½ of the maximally expanded length of the display.

According to various embodiments, the electronic device may further include a side wall structure (e.g., the side wall structure 216 in FIG. 8) configured to move the module mounting unit in response to the contraction of the display region of the display.

According to various embodiments, the side wall structure may be provided on an inner surface of the slide housing.

According to various embodiments disclosed herein, it is possible to provide an electronic device (e.g., the electronic device 100 of FIG. 8) including: a housing (e.g., the housing 200 in FIG. 4) including a first surface oriented in a first direction (e.g., a direction parallel to the Z axis in FIG. 8), a second surface oriented in a second direction opposite to the first direction, a side surface surrounding at least a part of the space between the first surface and the second surface (e.g., the first side surface 201a or the second side surface 202a in FIG. 4), wherein the housing further includes a main housing (e.g., the second structure 202 in FIG. 8) and a slide housing (e.g., the first structure 201 in FIG. 8) configured to slide with respect to the main housing such that at least a part of the side surface can protrude to an outside of the housing; a flexible display (e.g., the display 203 in FIG. 8) including a first region (e.g., the first region A1 in FIG. 3) oriented in the first direction and a second region (e.g., the second region A2 in FIG. 3) extending from the first region, wherein the flexible display is configured such that the first region is expandable by causing at least a part of the second region to be oriented in the first direction based on a sliding movement of the slide housing; a wireless charging module including a wireless charging antenna and a module mounting unit (e.g., the module mounting unit 314 in FIG. 8) surrounding at least a part of the wireless charging antenna, wherein the wireless charging module is disposed adjacent to the second surface of the housing; a hook structure (e.g., the hook structure 215 of FIG. 8) configured to move the module mounting unit in response to the expansion of the display; and a side wall structure (e.g., the side wall structure 216 of FIG. 8) configured to move the module mounting unit in response to the contraction of the display, wherein the wireless charging module is configured to be movable and to be located at the center of the width of the housing in response to the state of the electronic device according to the expansion or contraction of the display region of the flexible display.

As used herein, the term "module" may include a unit implemented in hardware, software, or firmware, and may be interchangeably used with other terms "logic," "logic block," "component," or "circuit". The "module" may be a minimum unit of a single integrated component adapted to perform one or more functions, or a part thereof. For example, the "module" may be implemented in the form of an application-specific integrated circuit (ASIC).

Embodiments as set forth herein may be implemented as software (e.g., program) including one or more instructions that are stored in a storage medium (e.g., internal memory or external memory) that is readable by a machine (e.g., electronic device). For example, a processor of the machine may invoke at least one of the one or more instructions stored in the storage medium and execute the instruction. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" indicates that the storage medium is a tangible device, and does not include a signal, but this term does not differentiate between where data is semi-permanently or temporarily stored in the storage medium.

Methods according to embodiments herein may be included and provided in a computer program product that may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or directly between two user devices. If distributed online, at least part of the computer program product may be temporarily generated or at least temporarily stored in the machine-readable storage medium, such as memory of the manufacturer's server, a server of the application store, or a relay server.

Each element (e.g., a module or a program) of the above-described elements may include a single entity or multiple entities. One or more of the above-described elements may be omitted, or one or more other elements may be added. Alternatively or additionally, a plurality of modules or programs may be integrated into a single element. In such a case, the integrated element may still perform one or more functions of each of the plurality of elements in the same or similar manner as they are performed by a corresponding one of the plurality of elements before the integration. Operations performed by the module, the program, or another element may be performed sequentially, in parallel, repeatedly, or heuristically, or one or more of the operations may be executed in a different order or omitted, or one or more other operations may be added.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
   a housing including a first surface oriented in a first direction, a second surface oriented in a second direction opposite to the first direction, a first side surface at least partially surrounding a space between the first surface and the second surface, and a second side surface facing away from the first side surface;
   a flexible display including a first region oriented in the first direction and a second region extending from the first region, wherein the first region is configured to be expandable by causing at least a part of the second region to be oriented in the first direction based on a slide movement of at least a part of the housing; and
   an antenna module disposed adjacent to the second surface of the housing, the antenna module including:
   a wireless charging antenna; and
   a module mounting unit configured to surround at least a part of the wireless charging antenna and to be movable in an internal space inside the housing in response to a state of the electronic device according to expansion or contraction of a display region of the display.

2. The electronic device of claim 1, wherein the state of the electronic device according to the expansion or contraction of the display region of the flexible display includes:
   an open state in which the first region of the display is maximally expanded, or
   a closed state in which the first region of the display is maximally contracted.

3. The electronic device of claim 1, further comprising:
   a battery and a main circuit board disposed inside the housing,
   wherein the housing includes a main housing and a slide housing coupled to be slidable with respect to the main housing.

4. The electronic device of claim 3,
   wherein the module mounting unit includes a substrate on which the wireless charging antenna is mounted and a flexible printed circuit board (FPCB) configured to interconnect the substrate and the main circuit board.

5. The electronic device of claim 3,
   wherein the antenna module is disposed on one surface of the slide housing.

6. The electronic device of claim 5,
   wherein the module mounting unit is configured in a form of a box capable of accommodating the antenna module in the internal space of the housing.

7. The electronic device of claim 5, further comprising a hook structure configured to move the module mounting unit in response to the expansion of the display region of the display.

8. The electronic device of claim 7,
   wherein the module mounting unit includes at least one recess, and
   wherein the hook structure disposed on an inner surface of the housing is engaged with the at least one recess when the display region of the display is expanded or contracted.

9. The electronic device of claim 8, wherein the hook structure includes:
   a first hook structure disposed on an inner surface of the slide housing; and
   a second hook structure disposed on an inner surface of the main housing.

10. The electronic device of claim 7,
wherein the housing includes at least one recess and is configured such that the hook structure provided on the module mounting unit is engaged with the at least one recess when the display region of the display is expanded.

11. The electronic device of claim 8,
wherein the hook structure is configured to be rotatable when the display region of the display is expanded or contracted.

12. The electronic device of claim 8,
wherein the hook structure includes an outer circumference configured in a sprocket shape, and
wherein the recess is provided with teeth corresponding to the outer circumference of the hook structure.

13. The electronic device of claim 8,
wherein the recess has a length of ½ of a maximum expansion length of the display region of the display.

14. The electronic device of claim 5, further comprising a side wall structure configured to move the module mounting unit in response to the contraction of the display region of the display.

15. The electronic device of claim 14,
wherein the side wall structure is disposed on an inner surface of the slide housing.

* * * * *